US009613481B2

(12) United States Patent
Jacomet et al.

(10) Patent No.: US 9,613,481 B2
(45) Date of Patent: *Apr. 4, 2017

(54) SYSTEMS, METHODS, AND COMPUTER-READABLE MEDIA FOR SHEET MATERIAL PROCESSING AND VERIFICATION

(71) Applicant: Giesecke & Devrient America, Inc., Dulles, VA (US)

(72) Inventors: Robert Anthony Jacomet, Largo, FL (US); James Patrick Goodwin, Jr., Las Vegas, NV (US)

(73) Assignee: Giesecke & Devrient America, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,744

(22) Filed: Apr. 24, 2014

(65) Prior Publication Data

US 2015/0098642 A1 Apr. 9, 2015

Related U.S. Application Data

(63) Continuation-in-part of application No. 14/046,621, filed on Oct. 4, 2013.

(51) Int. Cl.
*G06Q 40/00* (2012.01)
*G07D 11/00* (2006.01)
*G07D 7/00* (2016.01)

(52) U.S. Cl.
CPC ......... *G07D 11/0066* (2013.01); *G07D 7/004* (2013.01)

(58) Field of Classification Search
USPC .......................... 235/379, 375; 382/135, 137
See application file for complete search history.

(56) References Cited

U.S. PATENT DOCUMENTS 5,917,930 A 6/1999 Kayani et al.
6,889,849 B2 5/2005 Heidel et al.
(Continued)

FOREIGN PATENT DOCUMENTS

EP 1111553 A2 6/2001
KR 200303526 Y1 2/2003
(Continued)

OTHER PUBLICATIONS

Korean Intellectual Property Office, Written Opinion of the International Searching Authority for International Application No. PCT/US2014/068711 (counterpart to above-captioned application), mailed Feb. 27, 2015.

*Primary Examiner* — Ahshik Kim
(74) *Attorney, Agent, or Firm* — Drinker Biddle & Reath LLP

(57) ABSTRACT

Methods and systems disclosed herein for processing sheets of sheet material include receiving a sheet in a first sheet-accepting device. The methods and systems include detecting first information of the sheet, which includes a first serial number of the sheet. The methods and systems include receiving each of the sheets in a second sheet-accepting device. The methods and systems methods and systems include detecting second information of each sheet, which includes a second serial number of such sheet. The methods and systems include determining whether the first serial number of the sheet matches the second serial number of any of the sheets. The methods and systems include generating a report in response to determining that the first serial number of the sheet does not match the second serial number of any of the sheets.

20 Claims, 17 Drawing Sheets

(56) References Cited

U.S. PATENT DOCUMENTS

| | | | | |
|---|---|---|---|---|
| 6,955,263 | B2 | 10/2005 | Steinkogler et al. | |
| 7,131,593 | B2 | 11/2006 | Steinkogler et al. | |
| 7,377,423 | B2 | 5/2008 | Demmeler et al. | |
| 7,748,610 | B2 | 7/2010 | Bell et al. | |
| 8,459,540 | B2 | 6/2013 | Brindley et al. | |
| 8,783,555 | B2 | 7/2014 | Brindley et al. | |
| 9,058,710 | B2 * | 6/2015 | Jacomet | G07D 11/0036 |
| 2005/0040225 | A1 * | 2/2005 | Csulits | G07G 1/0045 235/379 |
| 2005/0209966 | A1 | 9/2005 | Demmeler et al. | |
| 2007/0152034 | A1 * | 7/2007 | Dietz | G07D 7/00 235/379 |
| 2009/0087076 | A1 | 4/2009 | Jenrick et al. | |
| 2009/0188974 | A1 * | 7/2009 | Haycock | G07D 7/00 235/379 |
| 2013/0317960 | A1 * | 11/2013 | Holl | G07D 7/0033 705/35 |

FOREIGN PATENT DOCUMENTS

| | | | |
|---|---|---|---|
| KR | 1020070042698 | A | 4/2007 |
| WO | 2009/053077 | A1 | 4/2009 |

* cited by examiner

SYSTEMS, METHODS, AND COMPUTER-READABLE MEDIA FOR SHEET MATERIAL PROCESSING AND VERIFICATION

CROSS-REFERENCE TO RELATED APPLICATION

This application is a continuation-in-part application of U.S. patent application Ser. No. 14/046,621, filed on Oct. 4, 2013, the disclosure of which is incorporated herein by reference in its entirety.

TECHNICAL FIELD

The present disclosure relates generally to accounting and security, and more specifically to systems, methods, and computer-readable media for sheet material processing and verification.

BACKGROUND

Processing banknotes as separate deposits is generally known. In preparing the deposits for processing by a banknote processing machine, data or information of each deposit is detected and made available to the bank note processing machine through a middleware system. Such data or information includes information on the depositor, account number, and the quantity and value of the banknotes forming the deposit. To permit uninterruptible processing by the banknote processing machine, the deposits are separated from each other by separation cards inserted between different deposits. The banknote processing machine recognizes these separation cards, commonly known as header cards, and thus, identifies the beginning of a new deposit during processing.

In casinos or other gaming establishments, customers enter currency or tickets into slot machines, which include bill validators that check for authenticity of such currency and tickets and that determine the denominations of such currency and the values of such tickets. When the bill validators determine that the currency or tickets are authentic, the slot machines will accept the currency or tickets and convey the accepted currency or tickets to a container therein. Sometime later, the container is removed from the slot machine and taken to a count room for further processing. In the count room, a new separator card is printed with information identifying the container or identifying information on an existing separator card is linked to the information identifying the container, and the separator card is placed with the currency and tickets from the container. The separator card and the currency are then placed in a processing machine with other currency, tickets, and separator cards, and the processing machine counts the currency and tickets, determines the denominations of the currency and values of the tickets, reconfirms the authenticity of the currency and tickets, and associates the currency and tickets with the container from which they came based on a position of the separator card among the currency and tickets. Similarly, customers provide currency or tickets to casino employees at table games, and the casino employees enter such currency or tickets into table game bill acceptors, which perform processes similar to those performed by bill validators and which also have containers for storing currency and tickets that are processed similarly to the corresponding containers in slot machines.

In known methods for processing currency, such as those described in U.S. Pat. No. 5,917,930 A, account data associated with a currency deposit is collected at the time of a deposit and associated with a separator card, which is placed with the currency deposit. The account data includes the number of individual currency notes in the deposit, the total currency value of the deposit, and information associating the deposit to a single commercial transaction or a particular recipient. The account data is associated with the separator card either through linking a bar code number unique to the specific separator card or by encoding the account data directly on the separator card. The deposit can then be stacked in the processing machine with the separator card linked to or encoded with the account data.

In a banking-type environment, which often includes armored carriers or other types of note handling or consolidating establishments, notes are counted many times and at different intervals. A retail merchant, for example, typically counts currency notes on currency counting devices often referred to as "note discriminators" or "currency counters." In certain scenarios, the currency notes are again counted, or counted for the first time, on such currency counting devices when the currency notes are received from the retail merchant by a bank or other consolidator. Some of these currency counting devices are capable of capturing unique information, such as the serial number of the banknote.

A casino environment often includes activities such as those related to "table game" systems and processes, "kiosk" systems and processes, and "non-gaming" systems and processes. The table game process often begins with the removal of a canister from the table, inside which, notes captured by a table game employee, such as a dealer, are disposed. These banknotes are removed and prepared for processing in the a count room, which is often operated by the casino or a contractor thereof. Maintaining the integrity of currency in relation to a table game identifier, which is disposed with or on the canister, and which identifies the particular table game from which the canister was removed, is paramount. In the case of kiosk processes or non-gaming processes, such processes can be similar to table game processes, except that kiosks often utilize a different canister configuration and non-gaming systems often utilize deposit bags that are issued to each employee of the casino.

SUMMARY OF THE INVENTION

According to aspects of the present disclosure, methods disclosed herein for processing a plurality of sheets of sheet material include a plurality of processes. The methods include a process of receiving a sheet in a first sheet-accepting device. The methods include a process of detecting, by a first sensor mechanism of the sheet-accepting device, first information of the sheet. The first information of the sheet includes a first serial number of the sheet. The methods include a process of receiving each sheet of the plurality of sheets in a second sheet-accepting device. The methods include a process of detecting, by a second sensor mechanism of the second sheet-accepting device, second information of each sheet of the plurality of sheets. The second information of each sheet includes a second serial number of such sheet. The methods include a process of determining whether the first serial number of the sheet matches the second serial number of any of the plurality of sheets. The methods include a process of generating a report in response to determining that the first serial number of the sheet does not match the second serial number of any of the plurality of sheets.

According to other aspects of the present disclosure, non-transitory, computer-readable media store computer-readable instructions therein. When executed by a processor, the computer-readable instructions instruct the processor to control processes for processing a sheet of sheet material. The processes include receiving the sheet in a first sheet-accepting device. The processes include detecting, by a first sensor mechanism of the sheet-accepting device, first information of the sheet. The first information of the sheet includes a first serial number of the sheet. The processes include receiving each sheet of the plurality of sheets in a second sheet-accepting device. The processes include detecting, by a second sensor mechanism of the second sheet-accepting device, second information of each sheet of the plurality of sheets. The second information of each sheet includes a second serial number of such sheet. The processes include determining whether the first serial number of the sheet matches the second serial number of any of the plurality of sheets. The processes include generating a report in response to determining that the first serial number of the sheet does not match the second serial number of any of the plurality of sheets.

According to still other aspects of the present disclosure, systems disclosed herein, which process a plurality of sheets of sheet material, include a first sheet-accepting device, a second sheet-accepting device, and a management system. The first sheet-accepting device receives a sheet. Further, the first sheet-accepting device includes a first sensor mechanism that detects first information of the sheet. The first information of the sheet includes a first serial number of the sheet. The second sheet-accepting device receives each sheet of the plurality of sheets. Further, the second sheet-accepting device includes a second sensor mechanism that detects second information of each sheet of the plurality of sheets. The second information of each sheet includes a second serial number of such sheet. The management system determines whether the first serial number of the sheet matches the second serial number of any of the plurality of sheets. Further, the management system generates a report in response to determining that the first serial number of the sheet does not match the second serial number of any of the plurality of sheets.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

Figure 1:
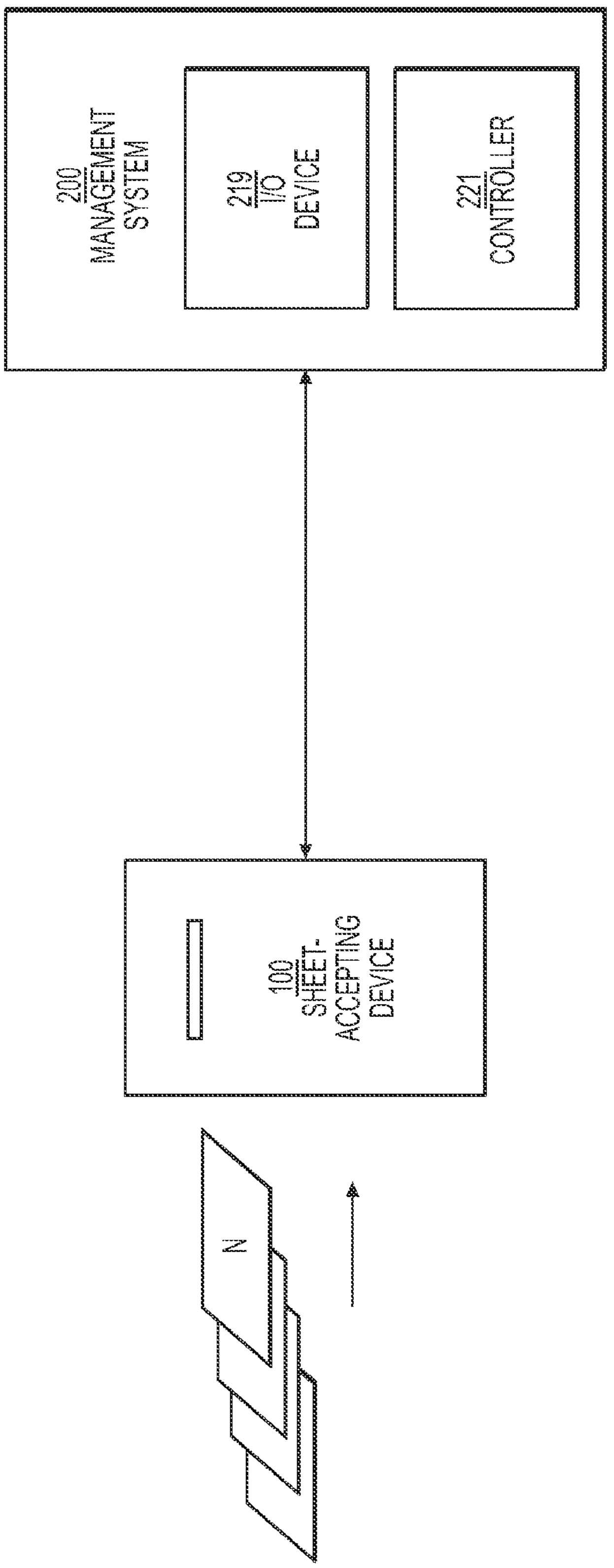
FIG. 1 is a schematic representation showing an embodiment of sheet-accepting device in communication with a management system in accordance with the present invention.

The systems, methods, and media of the invention are suitable for use with and may incorporate various components of the systems and methods disclosed in Patent Application No. PCT/EP2008/008991, filed on Oct. 23, 2008; U.S. Pat. No. 7,377,423 B2, published on May 27, 2008; U.S. Pat. No. 7,131,593 B2, published on Nov. 7, 2006; and U.S. Pat. No. 6,955,263, published on Oct. 18, 2005, the disclosures of which are hereby incorporated by reference in their entirety. Although many of the exemplary embodiments disclosed herein, as well as in these incorporated disclosures, are directed toward casino operations and gaming, the invention disclosed herein is not limited to applications in the field of casino operations and gaming, but rather is applicable to a wide range of applications in the financial services industry and beyond, including, but not limited to, retail banking, retail commerce, currency exchanges, law enforcement, central banking, clearing houses and processing of commercial paper, accounting, auditing, and many other fields.

In currency-processing systems, a serialized header card is linked to an asset, such as a slot machine, a cashier's drawer, or a particular gaming table. The serialized header card is placed in a tray in front of currency to be counted. Consequently, when the tray of currency is placed in a currency-counting machine, and the linking information on the header card, such as a bar code, is read by the currency-counting machine, the currency-counting machine associates the currency behind the header card with the linking information on the header card. The currency-counting machine subsequently reports details of the currency (e.g., a value of the currency, a type of the currency, count information indicating a quantity of each type of currency) to a management system (e.g., a casino management system, a financial institution management system). An exemplary management system used in a casino environment, for example, is the BPS Connect Casino management system (BPS is a registered trademark of Giesecke & Devrient America, Inc. of Dulles, Va.), which provides an interface between note processing systems and accounting systems and includes global localization capabilities, capabilities for casino accounting system connectivity, and capabilities for header card creation on demand. Nevertheless, such currency-processing systems require additional time to print the linking information, which links to a particular asset, on the header card and to place the header card with the currency in the tray. Thus, a significant amount of time is wasted, and operators are burdened with the task of header card placement. Moreover, because the currency is associated with the header card based on the position of the header card relative to the currency, improper placement of the header card may result in accounting or verification errors caused by associating the currency with an incorrect header card. In addition, the header cards may become concealed by the currency, which may prevent the currency-counting machine from detecting the header card or the linking information and lead to further accounting and verification errors.

Accordingly, embodiments of the present invention address these and other problems by detecting characteristic information (e.g., serial number, other unique markings) existing on sheet material (e.g., currency, commercial tickets, banknotes, checks, other sheets of value) and associating such characteristic information directly with asset information that identifies a particular asset (e.g., a slot machine, a gaming table, a bill validator, a sheet container or carrier, a table game bill acceptor, a cashier or teller drawer, a cashier or teller, a business division or entity). Thus, the need for a header card or other separator card may be eliminated. Further, even in scenarios in which separator cards are still used, the need to print new separator cards for each asset may be eliminated by associating a reusable separator card with the asset; placing the reusable header card with sheets associated with the asset; detecting characteristic information of the sheets; and associating the characteristic information of the sheets with the asset based on their position with respect to the header card and the association between the header card and the asset. Consequently, embodiments of the present invention permit faster, more efficient, and less costly sheet-processing and verification by enabling the use of reusable header cards and, if desired, eliminating the need for header cards completely.

As used herein, the term "serial number" corresponds to a specific marking on or of sheet material that identifies a particular sheet of the sheet material.

In particular, slot machines and gaming devices often employ a bill acceptor into which gamblers insert cash or other sheets of value to initiate play. The bill acceptor includes a bill validator that checks various aspects of the inserted sheet, including denomination or value and authenticity. Likewise, casino table-game dealers (e.g., casino employees) enter sheets, which are exchanged for casino-branded chips, into a device that functions similarly to a bill validator and is located within, attached to, or adjacent to a table game. In addition to currency and other sheets of value, casino customers may enter commercial tickets, often referred to as ticket-in-ticket-out ("TITO") tickets, into the bill acceptor. Such commercial tickets (e.g., TITO tickets) have a quantifiable value and are regularly tracked by a management system.

In response to the challenges above, the embodiments of the present invention employ a bill acceptor that incorporates data reading in order to capture data from an inserted sheet of sheet material, including serial number data, denomination data, count data, series data, and other useful data. The bill acceptor then stores the recorded data onto a memory device (e.g., a radio-frequency identification ("RFID") chip, a solid state memory component, a hard drive, a magnetic tag, or other memory storage component) coupled to a container that accepts the deposit (e.g., one or more sheets inserted into the bill validator). Alternatively or additionally, the bill acceptor stores the recorded data into an internal (e.g., for a casino, a local casino management system; for a financial institution, a financial institution management system) or an external (e.g., for a casino, a financial institution management system; for a casino or a financial institution, an auditor or accountant's management system) database. The data retrieved from the notes is then associated with the container directly or with an asset number of the container (e.g., match and register the serial numbers of the collected notes to the asset number of the container). The data can be ascertained locally at the gaming device or at a remote computing device (e.g., a computer station, a server) that is in communication with the gaming device via a network. In addition to storing the data to a local memory device, the data can also be transmitted over the network to a management system or other software database for storage and processing. In some configurations, the data retrieved from the notes is associated with deposit information, which can include, for example, the number of sheets N in a deposit (e.g., the insertion of a group of one or more notes in sheet-accepting device 100), the total currency value of the deposit, and information associating the deposit to a single commercial transaction or a particular recipient. In certain configurations, for example, the deposit information is associated with asset information about a sheet-accepting device 100 at which the deposit was made.

At an appropriate time, the container is removed from the gaming device and transported to a count room for handling. In the count room, the container is docked to a receiving device or a receiving station that recognizes the container identification (e.g., the asset number or other information identifying the container) and registers the container and the originating machine to the management system. The receiving station also retrieves the stored data from the container memory (e.g., reading the RFID or other tag with an appropriate reader, accessing another type of memory) and transmits it to the management system to facilitate tracking if the data has not already been transmitted at time of acquisition or in addition thereto.

The currency or other sheet material in the container is then removed from the container and processed in a currency processing machine. During that process, the currency is counted and the data is read again and compared against the data retrieved from the container memory for verification purposes. A report is generated and transmitted to at least one of a management system and a financial accounting system.

At any point in the above-described sequence, serial number data can be assessed against a counterfeit registry for verification. Additionally, if identical serial numbers are processed within a specific period of time (e.g., 24 hours), then a monitoring system may be activated (e.g., E-Connect) to observe the flow of the suspect sheets (e.g., counterfeit currency, counterfeit commercial tickets, counterfeit banknotes, counterfeit checks, other counterfeit sheets of value). Using the data collected, an origin of such suspect sheets can be traced to a particular asset on a particular date at a particular time, and the subsequent flow of such suspect sheets through, for example, a casino or a financial institution may be tracked.

In many instances, the currency processing machine described above is, for example, a device which processes header cards and currency in sequence. This machine uses sensors to obtain relevant information from the header cards and currency or other sheets, such as serial numbers, denominations, and series. Similarly, in some configurations, the receiving device or station is a device that reads data from a container in order to associate the contents of the container with a value that is stored in a management system. In certain configurations, the receiving device includes an RFID tag reader that reads the information stored in (e.g., written to) an RFID tag coupled to the container. Nevertheless, in other configurations, the receiving device includes other devices for reading from a memory device coupled to the container, such as a universal serial bus port, a magnetic sensor, a scanning device, or other device that may read from the memory device.

In many instances, the management system includes a collection of PC-based storage devices and software that interact in real-time with the firm's other systems in order to obtain detailed data on the operations of the firm's infrastructure devices (e.g., for a casino, the casino's gaming and non-gaming devices) in order to obtain detailed data on the operations of such devices. In this manner, the management system is able to gather critical information, which may be reported to managers and to governmental authorities.

In many configurations, a bill validator is a device in which the customer inserts currency or a commercial ticket or voucher. The bill validator scans the item (e.g., sheet) inserted for authenticity. In the case of a commercial ticket or voucher, the bill validator interacts with the management system to ensure that the item has not been previously redeemed. In the case of currency, the bill validator uses a scanner along with an on-board stored memory and processor to determine the authenticity of the currency. In some configurations, the bill validator also communicates with the management system or another agent to assist in determining the authenticity of the currency or other sheet. Further, the bill validator is coupled to a container that is engineered to physically store currency and commercial tickets or vouchers that have passed through the bill validator. The container receives the items mechanically from the bill validator and is secured from tampering by locking devices. In addition, the container is removable to permit uncoupling from a gaming device for transporting the container to the count room or another location. In this manner, currency or other valuable sheet material stored in the container is secured during transport.

In summary, the bill validator or another type of device, such as a table game bill acceptor, for example, captures a unique serial number of a sheet, such as a currency note or a commercial ticket. In this manner, the sheet may be associated with the particular gaming device that includes the bill validator during subsequent processing. The serial numbers obtained may be stored several ways. For example, as the serial number data or other data is captured, the serial number data or other data may be written to an RFID tag or other memory device disposed on a storage chamber that stores the validated sheets and is coupled to the bill validator. Alternatively or additionally, as the serial number data or other data is captured, the serial number data or other data may be written to the management system's database for storage and subsequent retrieval. In some configurations, for example, a Drop-Trax or other middleware system is used to gather information from the bill validator or the RFID tag (or other memory device), and the gathered information is subsequently transferred from the Drop-Trax or other middleware system to one or more of the management system's database for storage and subsequent retrieval and a sheet-processing device in a counting room.

On a periodic basis (e.g., daily, weekly), the sheets are collected from the bill validators within the gaming devices (e.g., slot machines, table game bill acceptors) by removing the containers with the sheets disposed therein, and the containers are sent to the casino's soft count room for processing (e.g., verification and reporting). In the soft count room, the sheets are removed from the container and processed, and the contents of the container are reported to the management system for reconciliation. Further, when the serial number data including the serial numbers of the sheets stored in the container is stored in an RFID tag coupled to the container, the information in the RFID tag is read and transferred to either the management system or a middleware device or application that may format such in a manner that will allow the management system to accept and process the information. Thus, the present invention permits the contents of the canister to be inserted directly into a currency counting or sorting device, which permits omission of the header card process and the extra steps the header card process entails.

In addition, certain configurations of the present invention utilize an ACCESS feeding system in which asset information is assigned to a particular container compartment and written to data storage, such as an RFID tag, through an available writing process, such as near-field communication. Thus, any header card may be disposed in the container compartment without printing information on the header card linking it to a particular asset. Thereafter, a bill processing system tracks the relationship between the header card and an asset number corresponding to an asset and reports processing information by asset number. For example, the ACCESS feeding system is an automated loading system in the count room that automatically loads currency and other sheets into a sheet-processing device to produce higher throughput and more efficient sheet processing.

Exemplary embodiments of the present invention provide methods, systems, and non-transitory computer-readable media for sheet material processing, verification, and accounting. Embodiments of the present invention, and their features and advantages, may be understood by referring to FIGS. 1-15, like numerals being used for corresponding parts in the various drawings. It is to be understood that processes performed by the various devices described herein and shown in FIGS. 1-15 are not limited to the particular order of steps described herein, and the order of such steps may be rearranged where possible. Further, certain steps described herein may be performed in parallel, omitted, or performed multiple times where appropriate.

FIG. 1 shows an embodiment of a sheet-accepting device 100 in communication with a management system 200 in accordance with the present invention. Sheet-accepting device 100 is configured to receive sheets N of sheet material, examples of which include: currency, TITO tickets and other commercial tickets, banknotes, checks, and other commercial or governmentally-issued monetary instruments. In particular configurations, such as that depicted in FIG. 1, sheet-accepting device 100 is configured to be in communication with management system 200, such that sheet-accepting device 100 is able to report information of sheets N, including: serial numbers of sheets N, value or denomination information of sheets N, series of sheets N, physical attributes of sheets N, total numbers of sheets N or of particular groups of sheets N, and other identifying information and authenticity information related to sheets N, to management system 200 after processing sheets N. In addition, sheet-accepting device 100 is able to send performance statistics to management system 200 that include: notifications of errors, notifications of damage, notifications of power outages, notifications of tampering, temperature data, usage data, and other information useful to ensuring continued system operation. Nevertheless, in some configurations, sheet-accepting device 100 sheet-accepting device reports only a portion of such information or none of this information to management system 200. Examples of sheet-accepting devices 100 include: slot machines, table game bill acceptors, change machines, ticket-redemption machines, money counters, check scanners, automated-teller machines, vending machines, and other mechanisms that accept sheets N.

In particular configurations, management system 200 is a casino management system that includes, for example, a collection of PC-based storage devices and software that interact in real-time with the casino's gaming and non-gaming devices, such as sheet-accepting device 100, and obtain detailed data on the operations of such gaming and non-gaming devices. In this manner, the management system is able to gather critical information, which may be reported to casino managers and to governmental gaming authorities. Thus, management system 200 receives information of processed sheets N and performance statistics from a plurality of sheet-accepting devices 100, which management system 200 uses to monitor these and other devices and to generate data for accounting, security, and regulatory purposes. Other examples of management system 200 include: accounting systems, audit control systems, clearing house management systems, financial institution management systems, and other management systems for managing the intake and processing of financial instruments. Moreover, management system 200 includes, for example, at least one input/output ("I/O") device 219, which receives and transmits data, and at least one controller 221, which stores and processes data and which controls other components (not depicted) of management system 200. I/O device 219 is a communication interface which includes, for example, one or more of a wireless communications interface and a hard-wired communications interface. Controller 221 is configured to execute computer-readable instructions stored on a non-transitory computer-readable medium. In some configurations, management system 200 communicates with external databases or computer systems to obtain additional information, such as registries of counterfeit or suspect currency information, law enforcement agencies, and various commercial databases.

Figure 2:
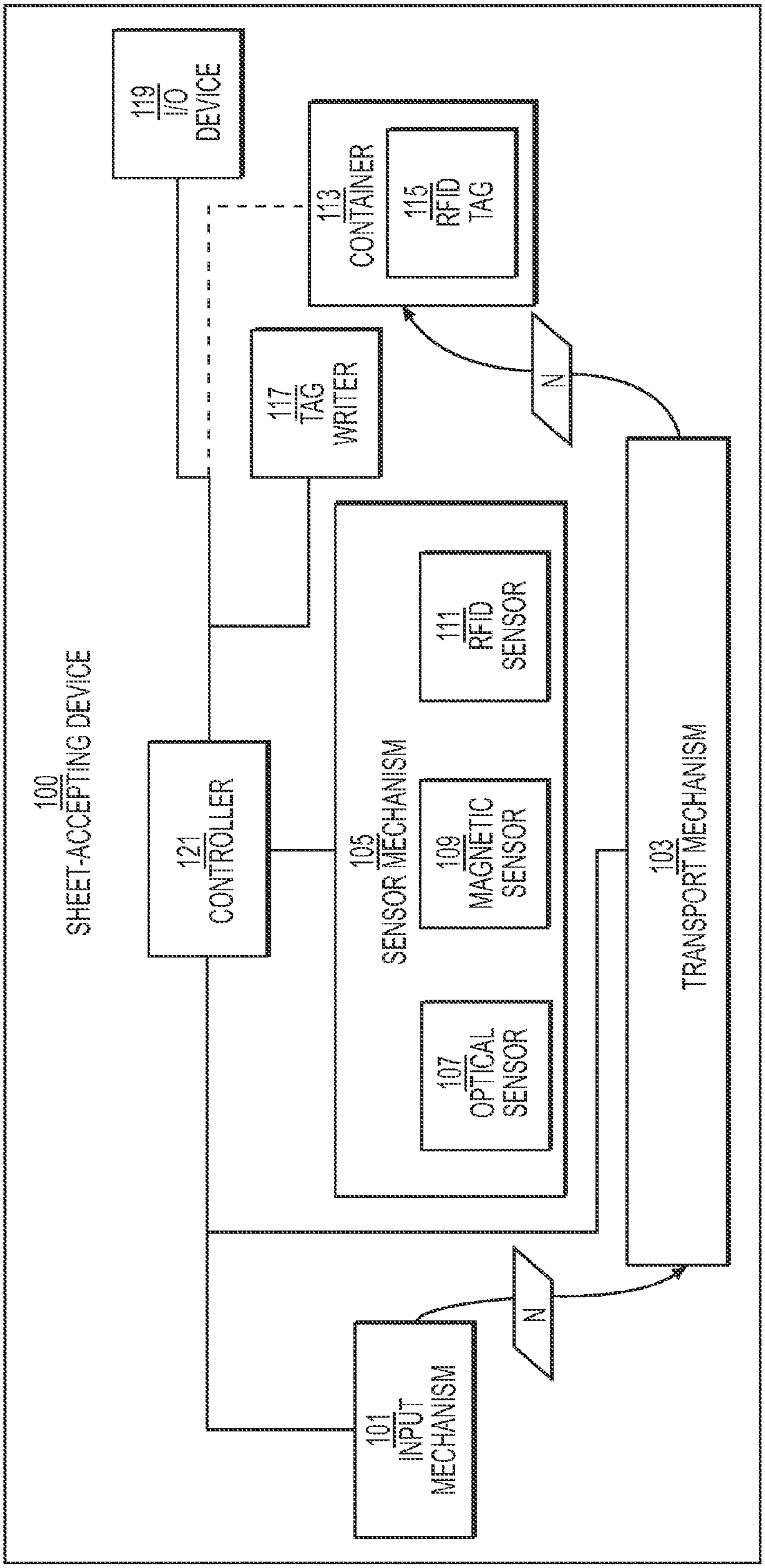
FIG. 2 is a schematic representation showing an embodiment of the sheet-accepting device shown in FIG. 1.
Figure 3:
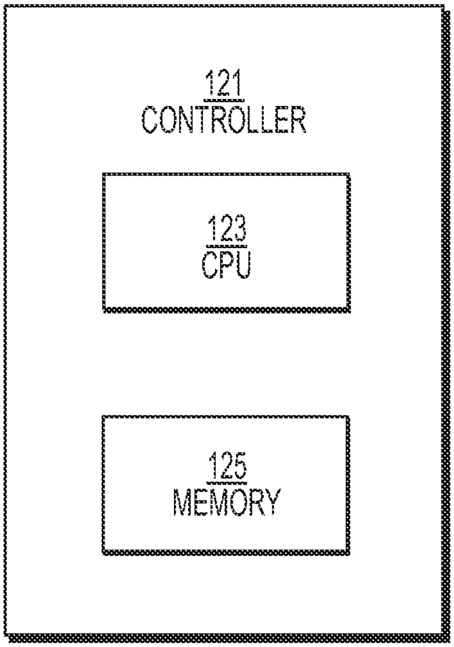
FIG. 3 is a schematic representation showing an embodiment of a controller of the sheet-accepting device shown in FIG. 2.

FIG. 2 shows an embodiment of sheet-accepting device 100. Sheet-accepting device 100 includes an input mechanism 101 configured to receive a sheet N therein. In particular configurations, input mechanism 101 is a slot with rollers configured to transport sheets N inserted therein into sheet-accepting device 100. Further, sheet-accepting device 100 includes a transport mechanism 103, which may be a series of rollers or other elements able to transport a sheet N, configured to transport sheets N to a sensor mechanism 105 (e.g., a first sensor mechanism) and a container 113 (e.g., a removable container). In particular configurations, input mechanism 101 is configured to accept a plurality of sheets N at once and at least one of input mechanism 101 and transport mechanism 103 is configured to separate the plurality of sheets N, so that only one sheet N at a time is transported to sensor mechanism 105. In this manner, sensor mechanism is able to accurately detect information of all of the plurality of sheets N.

When transport mechanism 103 transports a sheet N to sensor mechanism 105, sensor mechanism 105 detects information of sheet N (e.g., first information of the sheet). The information of sheet N includes a serial number of sheet N and a value (e.g., denomination) of sheet N, as well as other information including, for example, a series of sheet N; physical attributes of sheet N including dimensions, weight, opacity, and texture; and the presence of other identifiers, such as magnetic strips or ink, bar codes, holograms, punch marks, and RFID circuits. In particular configurations, sensor mechanism 105 includes: an optical sensor 107, a magnetic sensor 109, and an RFID sensor 111. Optical sensor 107 is a camera or scanner, for example, that records an optical image of each sheet N, which is thereafter processed by a controller 121 or transmitted to another device, such as a component of management system 200 or another device, for processing to extract at least a portion of the information of the sheet. In particular configurations, for example, sheet-accepting device 100 is able to determine at least the serial number and value of sheet N from the optical image of sheet N internally or at a remote device separate from management system 200. Magnetic sensor 109 detects magnetic ink or magnetic features on sheet N that provide information of sheet N, such as a magnetic strip that identifies the denomination of currency or magnetic ink that identifies account and routing numbers on checks. Because sheets N may not be appropriately separated during processing, magnetic sensor 109, which is able to detect magnetic signals through a plurality of overlapped sheets N, provides redundancy for obtaining information that is difficult for optical sensor 107 to obtain when sheet-separating errors occur. Similarly, RFID sensor 111 detects RFID circuits on sheet N that also provide information of sheet N and provides further redundancy for optical sensor 107. In some configurations, sensor mechanism 105 includes only one of optical sensor 107, magnetic sensor 109, and RFID sensor 111. In other configurations, sensor mechanism 105 includes various combinations of optical sensor 107, magnetic sensor 109, RFID sensor 111, and other sensors able to detect information of sheets N.

After sensor mechanism 105 has detected the information of sheet N, transport mechanism 103 transports sheet N to container 113, which is directly or indirectly coupled to sheet-accepting device 100. Container 113 is a removable container that is periodically separated from sheet-accepting device 100 and moved to a count room, as described in more detail below. Container 113 is able to be sealed and locked so that the sheets N disposed therein may not be tampered with or removed during transport to the count room. Container 113 includes a memory coupled thereto, which is embedded in or attached to a surface of container 113, such that the memory is transported with container 113 when container 113 is transported to the count room. In particular configurations, the memory is an RFID tag 115. In other exemplary configurations, the memory includes one or more of a solid state memory component, a hard drive, a magnetic tag or component, and an optical marking. The memory coupled to container 113 stores asset information, which identifies at least one of sheet-accepting device 100 and container 113. In other configurations, for example, container 113 is fully integrated with sheet-accepting device 100, such that sheet-accepting device 100 and are inseparable. In such configurations, for example, sheet-accepting device 100 is transported to the count room for further processing.

In particular configurations, sheet-accepting device 100 also includes a memory writing device, such as an RFID tag writer 117, and an I/O device 119. The memory writing device is configured to write information to the memory coupled to container 113. For example, RFID tag writer 117 is configured to write information to RFID tag 115. In other exemplary configurations, the memory writing device is one or more of a magnetic encoder, a printer, a wireless or hard-wired interface with the memory coupled to container 113, and any other device able to write information to the memory coupled to container 113. I/O device 119 is configured to provide a communications interface between sheet-accepting device 100 and management system 200, particular databases, and other devices involved in monitoring, controlling, managing, accounting, and auditing processes. I/O device 119 is substantially similar to I/O device 219 of management system 200, as described above.

Sheet-accepting device 100 also includes a controller 121 disposed therein. In other configurations, controller 121 is external to sheet-accepting device 100 and controls sheet-accepting device from a remote location. As shown in the embodiment shown in FIG. 3, controller 121 includes a central processing unit ("CPU") 123 and a memory 125. Memory 125 is a non-transitory memory device, examples of which include: one or more of a solid state drive, a hard drive, a random access memory, read-only memory, or other memory device, that stores computer-readable instructions for execution by CPU 123. When CPU 123 executes the computer-readable instructions stored in memory 125, the instructions instruct CPU 123 to control the functions of sheet-accepting device described herein. Specifically, controller 121 is configured to control the operations of the other components of sheet-accepting device 100.

Controller 121 receives a signal indicating that input mechanism 101 has received a sheet N. Subsequently, controller 121 controls transport mechanism 103 to transport sheet N to sensor mechanism 105, at which time controller 121 controls sensor mechanism 105 to detect the information of sheet N, which also includes, for example, the date and time at which sheet N was inserted into input mechanism 101. In particular configurations, controller 121 controls memory writing device (e.g., RFID tag writer 117) to write or store at least a portion of the information of sheet N, which is detected by sensor mechanism 105, in the memory (e.g., RFID tag 115) coupled to container 113. The at least a portion of the information of sheet N includes the serial number of sheet N and may also include one or more of the other pieces of information of sheet N described herein. In other configurations, controller 121 controls I/O device 119 to transmit the at least a portion of the information of sheet N, which is detected by sensor mechanism 105, to management system 200 or another device (e.g., a middleware component, another management system). In still other configurations, controller 121 controls the memory writing device to write or store at least a portion of the information of sheet N to the memory coupled to container 113 and to transmit the same or another at least a portion of the information of sheet N to management system 200 or another device. Controller 121 also controls transport mechanism 103 to transport sheet N to container 113.

In some configurations, controller 121 uses the information of sheet N to determine whether sheet N is authentic or deficient in some manner (e.g., damaged, discolored, distorted). In such configurations, controller 121 rejects sheet N and controls transport mechanism 103 to transport sheet N back to and out of input mechanism 101; accepts sheet N and controls transport mechanism 103 to transport sheet N to container 113, but generates a report including the information of sheet N, information indicating that sheet N may not be authentic, and asset information corresponding to one or more of sheet-accepting device 100 and container 113; or both when controller 121 determines that sheet N is not authentic or deficient in some manner. Further, when controller 121 determines that sheet N is authentic or is not deficient in some manner, controller 121 accepts sheet N and controls transport mechanism 103 to transport sheet N to container 113 and to perform the other processes described above.

Figure 4:
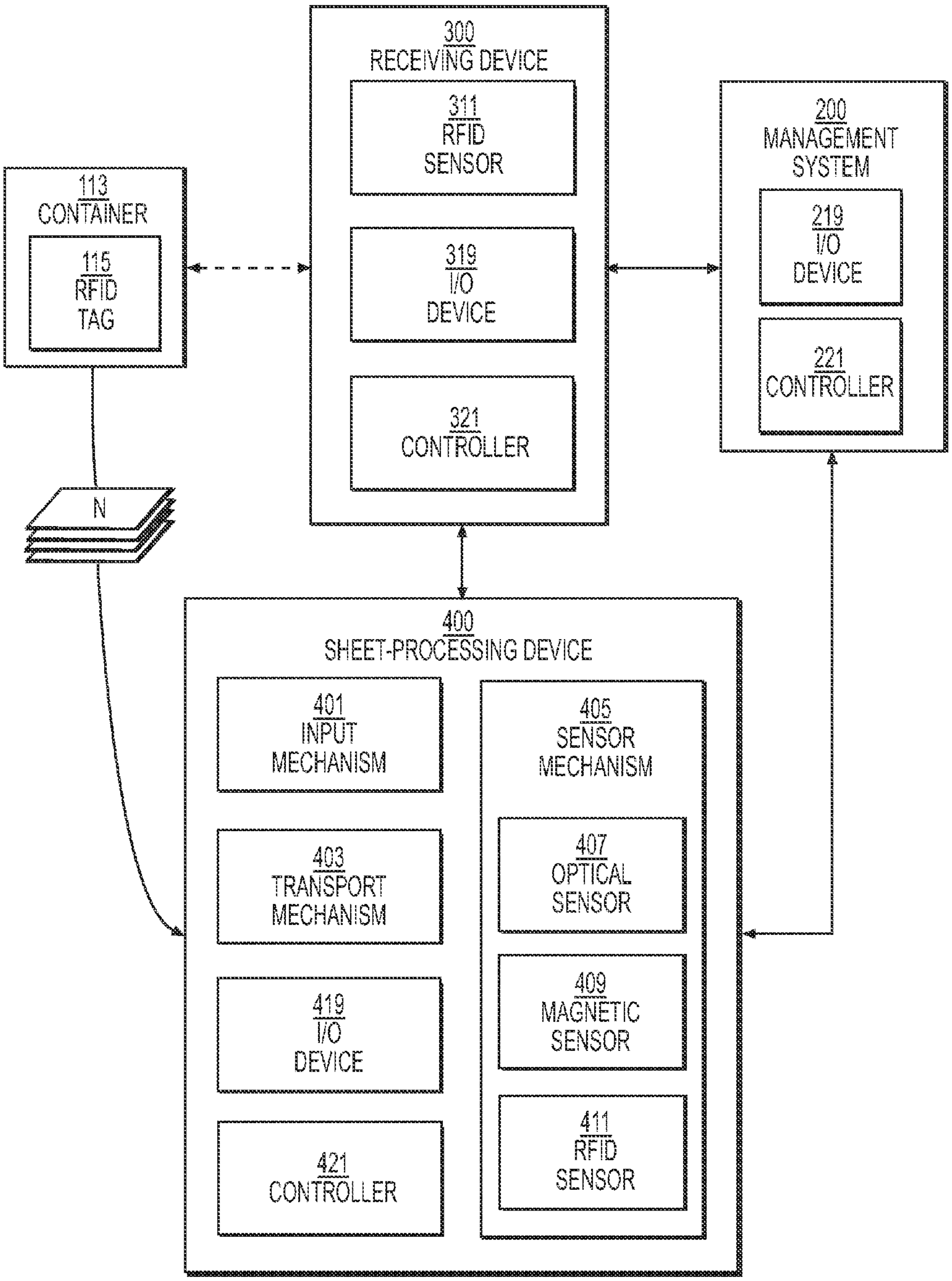
FIG. 4 is a schematic representation showing embodiments of a system showing communications among the management system shown in FIG. 1, a receiving device, a sheet-processing device, and a container separated from the sheet-accepting device shown in FIG. 1.

FIG. 4 shows embodiments of a system including management system 200, a receiving device 300, a sheet-processing device 400, and container 113 separated from sheet-accepting device 100 and respective communications therebetween. In particular configurations, receiving device 300 and sheet-processing device 400 are both disposed in the count room and, in some cases, may even be integrated into a single device. In other configurations, receiving device 300 and sheet-processing device 400 are disposed in separate locations.

Receiving device 300 is, for example, a docking station or device configured to dock with container 113. Receiving device 300 includes a memory-reading device configured to read the information of sheets N and the asset information stored in the memory coupled to container 113. In particular configurations, for example, the memory-reading device is an RFID sensor 311 configured to read RFID tag 115 coupled to container 113 when container 113 is docked with receiving device 300. Container 113 may dock with receiving device 300 in a variety of manners. In certain configurations, docking is accomplished by positioning container 113 such that the memory coupled to container 113 is within sufficient proximity for the memory-reading device of receiving device 300 to read information therefrom (e.g., proximity for a wi-fi link therebetween, proximity for near-field communications therebetween, proximity for magnetic detection, proximity for reading optical markings). In other configurations, docking is accomplished by creating a physical connection (e.g., connecting wires) between container 113 and receiving device 300. In still other configurations, receiving device 300 acts as an unlocking or interlocking mechanism for container 113, such that container 113 may be opened only after it is docked with receiving station 300 and the information of sheets N and the asset information has been read from the memory coupled to container 113.

Receiving device 300 includes an I/O device 319 that is configured similarly to I/O devices 119, 219 and that communicates with management system 200 and, in some configurations, also communicates with one or more of container 113, sheet-processing device 400, and other devices. In addition, receiving device 300 comprises a controller 321, which is substantially similar to controllers 121, 221 and which also executes computer-readable instructions. Controller 321 controls the memory-reading device (e.g., RFID sensor 311) to read the asset information and the information of the sheets H from the memory (e.g., RFID tag 115) coupled to container 113 when container 113 is docked to receiving device 300. Thereafter, controller 321 controls I/O device 319 to transmit the asset information and the information of sheets N obtained from container 113 to management system 200. In some configurations, controller 321 also controls I/O device 319 to transmit the asset information and the information of sheets N obtained from container 113 to sheet-processing device 400 or other devices (e.g., middleware devices).

Sheet-processing device 400 includes an input mechanism 401 that is configured to receive a plurality of sheets N therein. Specifically, a casino employee in the count room is able to open a plurality of containers 113 previously coupled to a plurality of sheet-accepting devices 100, remove sheets N from each of the plurality of containers 113, and combine sheets N from the plurality of containers 113 into a single stack, which the casino employee then places into input mechanism 401. In other configurations, for example, this process is automated and sheets N may be automatically loaded into input mechanism 401 after container 113 is docked with receiving device 300. In still other configurations, container 113 may be loaded directly into input mechanism 401.

Sheet-processing device also includes a transport mechanism 403, which separates sheets N placed in input mechanism 401 and, similarly to transport mechanism 103, transports each sheet N to sensor mechanism 405 (e.g., a second sensor mechanism). In a manner similar to that described above with respect to sensor mechanism 105, when transport mechanism 403 transports a plurality of sheets N to sensor mechanism 405, sensor mechanism 405 detects information of each sheet N of the plurality of sheets N (e.g., second information of each sheet) for a second time. The information of each sheet N also includes a serial number of sheet N and a value (e.g., denomination) of sheet N, as well as other information, examples of which include: a series of sheet N; physical attributes of sheet N including dimensions, weight, opacity, and texture; and the presence of other identifiers, such as magnetic strips or ink, bar codes, holograms, punch marks, and RFID circuits. Nevertheless, sensor mechanism 405 may detect different information of sheets N than sensor mechanism 105, less information of sheets N than sensor mechanism 105, or more information of sheets N than sensor mechanism 105, based on the processing needs of the casino or financial institution. In particular configurations, sensor mechanism 405 includes: an optical sensor 407, a magnetic sensor 409, and an RFID sensor 411. Optical sensor 407, magnetic sensor 409, and RFID sensor 411 are substantially similar to optical sensor 107, magnetic sensor 109, and RFID sensor 111 and are configured to detect similar information, except that optical sensor 407, magnetic sensor 409, and RFID sensor 411 may be more accurate than optical sensor 107, magnetic sensor 109, and RFID sensor 111. Specifically, transport mechanism 403 and sensor mechanism 405 are designed to more accurately separate sheets N and to more accurately detect the information of sheets N. In some configurations, sensor mechanism 405 includes only one of optical sensor 407, magnetic sensor 409, and RFID sensor 411. In other configurations, sensor mechanism 405 includes various combinations of optical sensor 407, magnetic sensor 409, RFID sensor 411, and other sensors able to detect information of sheets N. After transport mechanism 403 transports sheet N to sensor mechanism 405, transport mechanism 403 transports sheet N to a sorting machine (not shown), which, similarly to sheet-accepting device 100' shown in FIG. 14 below, sorts sheets N by at least one of type and denomination and prepares sheets N for deposit at a financial institution, recirculation, or destruction, as appropriate.

Sheet-processing device 400 also includes an I/O device 419, which is substantially similar to I/O devices 119, 219, 319, and enables sheet-processing device to transmit the information of each sheet N detected by sensor mechanism 405, as well as sending and receiving other information, to management system 200 and to send information to and receive information from receiving device 300. In addition, sheet-processing device 400 includes a controller 421, which is substantially similar to controllers 121, 221, 321 and which also executes computer-readable instructions. In some configurations, controllers 121, 221, 321, 421 may function as management devices that perform functions similar to the functions of management system 200. Controller 421 controls transport mechanism 403 to transport sheets N to sensor mechanism 405 and controls sensor mechanism 405 to detect the information of the sheets H. Further, controller 421 maintains a count of sheets N (e.g., in total, by type) and controls I/O device 419 to transmit the information of sheets N detected by sensor mechanism 405, including the count information, to management system 200. In some configurations, controller 421 also controls I/O device 419 to transmit the information of sheets N detected by sensor mechanism 405 to other devices (e.g., middleware devices). Similar to controller 121, controller 421 also performs an authenticity determination for each sheet N and generates a report when controller 421 determines that a sheet N is not authentic. In certain configurations, a separate (or special) compartment is provided to receive certain sheets N for further evaluation and dispensation. For example, when sheet-processing device 400 detects an anomaly, such as, for example, no match to the serial number presented, a match to a counterfeit list, an identical serial number processed (e.g., S303) within a predetermined period of time, or a serial number not read by sensor mechanism 405, sheet-processing device 400 rejects the sheet to the special compartment.

Figure 5A:
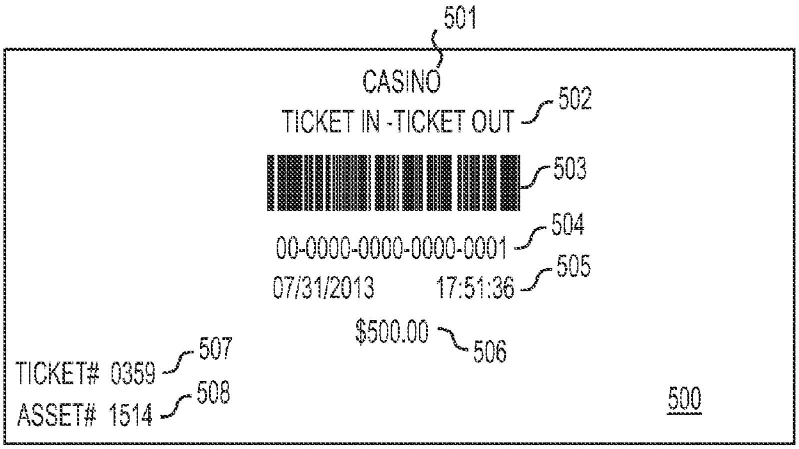
FIG. 5A is a schematic representation showing an exemplary commercial ticket.

FIG. 5A shows a TITO ticket 500, which is an exemplary commercial ticket. TITO ticket 500 includes a name of the issuing entity 501, a ticket identifier 502, one or more bar codes 503, a serial number 504, a date and time of issuance 505, a value or denomination 506, a ticket number 507, and an asset number 508. Serial number 504 is a unique number that uniquely distinguishes a particular TITO ticket 500 from other circulating TITO tickets 500 issued by the issuing entity identified by name of issuing entity 501. In particular configurations, bar code 503 is a coded version of serial number 504. In some configurations, bar code 503 is a coded version of other information or a combination of information, such as, for example, some combination of elements 501, 502, 504, 505, 506, 507, 508. Asset number 508 corresponds to the device that issued TITO ticket 500. As depicted in FIG. 5A, ticket number 507 indicates that TITO ticket 500 was the 359th ticket issued by the device corresponding to asset number 1514. In some configurations, TITO ticket 500 is dimensioned similar to local currency to facilitate processing by sheet-accepting device 100 and sheet-receiving device 300. In other configurations, TITO ticket is dimensioned differently from the local currency so that TITO ticket 500 is readily distinguishable from the local currency. In particular configurations, certain of elements 501-508, such as serial number 504 or value 506, are printed with magnetic ink for the purpose of redundancy and to facilitate detection by sensor mechanisms 105, 405. Moreover, TITO ticket 500 may contain other markings or features that may provide additional information described above to sensor mechanisms 105, 405.

Figure 5B:
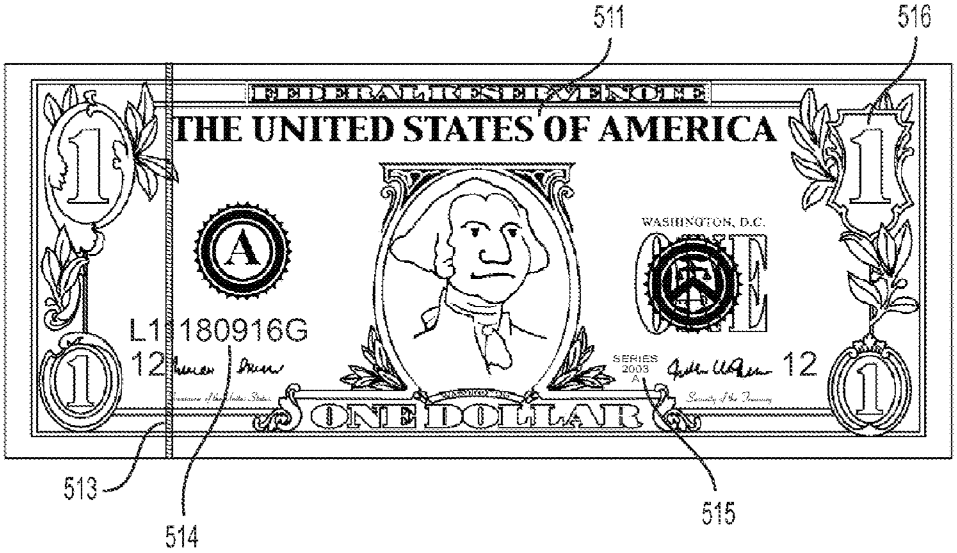
FIG. 5B is a schematic representation showing an exemplary currency note.

FIG. 5B shows an exemplary currency note 510. Currency note 510 includes a name of issuing government 511, a magnetic strip 513, a serial number 514, a series 515, and a value or denomination 516. Certain currency notes 510 include holograms and other characteristic markings. Similar to serial number 504, serial number 514 is a unique number that uniquely distinguishes a currency note 510 from other currency notes 510 of the same denomination and series issued by the issuing government identified by name of issuing government 511. Further, magnetic strip 513 is encoded with information about currency note 510, which may include one or more of name of issuing government 511, serial number 514, series 515, and value or denomination 516. In some configurations, certain of elements 511, 513-516, such as serial number 514 or denomination 516, are printed with magnetic ink. Moreover, currency note 510 may contain other markings or features that may provide additional information to sensor mechanisms 105, 405.

Figure 6:
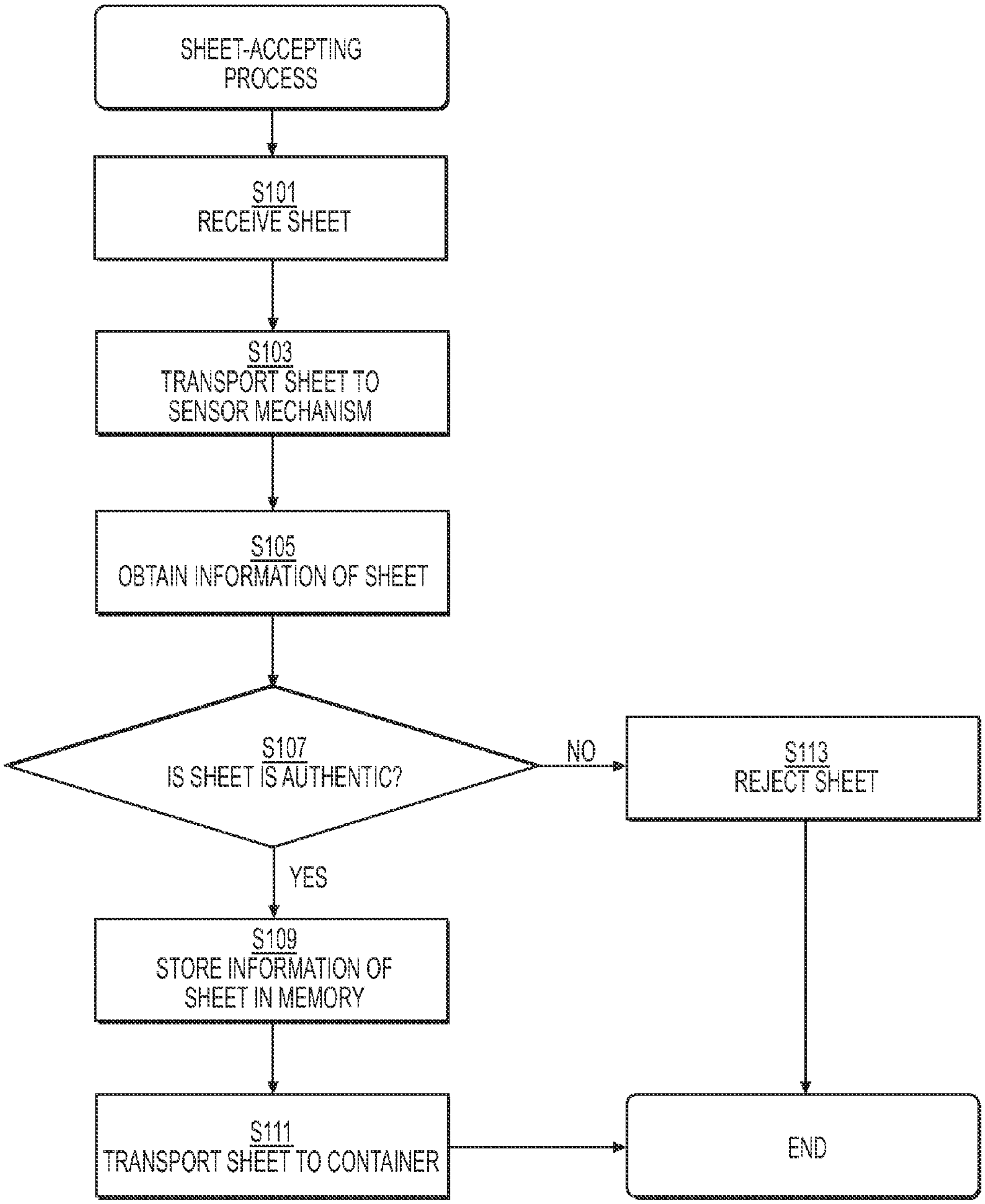
FIG. 6 is a flow chart showing an embodiment of a sheet-accepting process performed by the sheet-accepting device shown in FIG. 2.

FIG. 6 shows an embodiment of a sheet-accepting process performed by sheet-accepting device 100 in accordance with computer-readable instructions executed by controller 121. In S101, input mechanism 101 receives one or more sheets N inserted by a customer or employee. Subsequently, one or more of input mechanism 101 and transport mechanism 103 separates sheets N when the customer or employee inserts a plurality of sheets. In S103, transport mechanism 103 transports each sheet to sensor mechanism 105.

Figure 7:
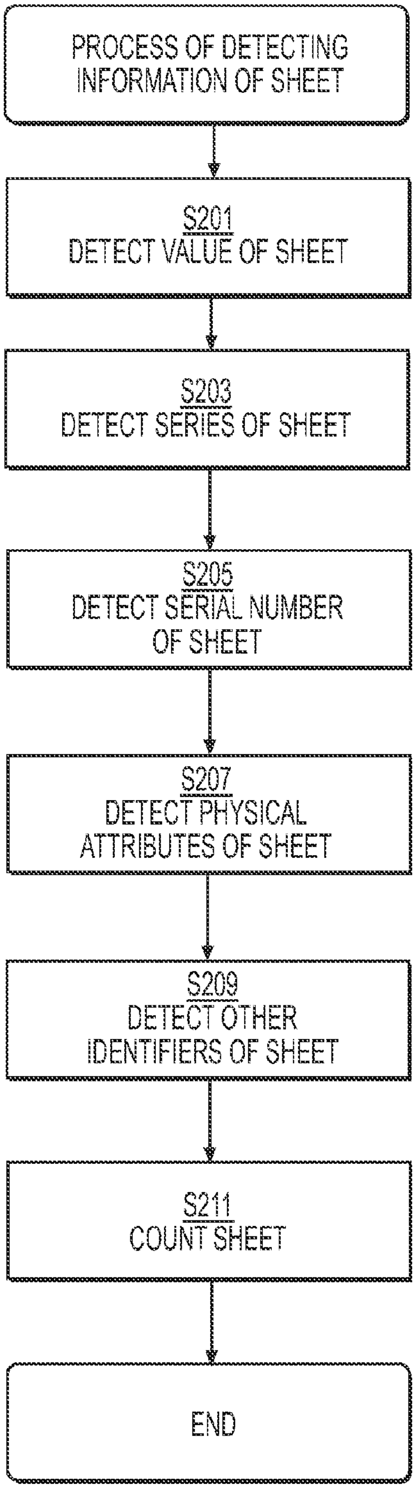
FIG. 7 is a flow chart showing an embodiment of a process of obtaining information of sheet performed by the sensor mechanism shown in FIG. 2.

In S105, sensor mechanism 105 detects information of sheet N. FIG. 7 shows exemplary details of the process of obtaining information of sheet N performed in S105. In S201, sensor mechanism 105 detects a value or denomination of sheet N, such as value 516 of currency note 510 or value 506 of TITO ticket 500. In S203, sensor mechanism 105 detects a series or equivalent information of sheet N, such as series 515 of currency note 510 or asset number 508 of TITO ticket 500. In S205, sensor mechanism 105 detects a serial number of sheet N, such as serial number 514 of currency note 510 or serial number 504 of TITO ticket 500. In S207, sensor mechanism 105 detects physical attributes of sheet N, such the dimensions, texture, weight, and composition of currency note 510 or TITO ticket 500. In S205, sensor mechanism 105 detects other identifiers of sheet N, such as name of issuing entity 501, type of sheet 502, bar code 503, date of issue 505, and ticket number 507 of TITO ticket 500 or name of issuing government 511 and magnetic strip 513 of currency note 510. Further, controller 121 stores time and date information identifying the time and date each sheet N was inserted into input mechanism 101. In particular configurations, for example, sensor mechanism 105 detects portions of information of sheet N by one or more of capturing an optical image of sheet N with optical sensor 107 and performing optical character recognition processes and detecting magnetically encoded markings or features, such as magnetic strip 513 in currency note 510, and subsequently decoding the information encoded therein. In particular configurations, controller 121 performs such optical character recognition and decoding processes. In other configurations, such optical character recognition and decoding processes are performed by an external device.

Returning to FIG. 6, controller 121 initiates an authentication process in S107. The authentication process includes using at least a portion of the information of sheet N detected by sensor mechanism 105 (e.g., authenticity information) to determine whether the sheet is authentic. For example, controller 121 compares the detected physical attributes of sheet N with known physical attributes for that particular type of sheet and determines that sheet N is not authentic if the detected physical attributes of sheet N deviate from the known physical attributes by more than a predetermined amount (e.g., 1% larger or smaller). In other examples, controller 121 makes authenticity determinations based on detected colors, the detected presence of features, such as magnetic strip 513, the particular arrangement of information on sheet N, and the formatting of detected information (e.g., a sheet N that uses a different font from the known font for that particular type of sheet would be determined to be not authentic). When controller 121 determines that sheet N is authentic (S107: YES), controller 121 controls tag writer 117 or another memory-writing device to store at least a portion of the information of sheet N detected by sensor mechanism 105 in the memory coupled to container 113 (e.g., write the at least a portion of information of sheet N to RFID tag 115) in S109. The at least a portion of the information of sheet N detected by sensor mechanism 105 includes at least the serial number of sheet N and may also include the other information of sheet N detected by sensor mechanism 105, such as the value of sheet N. Further, when controller 121 determines that sheet N is authentic (S107: YES), controller 121 also controls transport mechanism 103 to transport sheet N to container 113 in S111. S111 may be performed prior to S109, in parallel to S109, or after S109.

When controller 121 determines that sheet N is not authentic (S107: NO), controller 121 may reject sheet N in S113 and control transport mechanism 103 to transport sheet N back to input mechanism 101 and out of sheet-accepting device 100 to the customer or employee. In other configurations, when controller 121 determines that sheet N is not authentic (S107: NO), controller 121 performs one or more of a variety of other actions. In particular configurations, for example, controller 121 generates a report indicating that a sheet, which was determined to be not authentic, was inserted in sheet-accepting device 100 and providing the information of sheet N detected by sensor mechanism 105, including date and time information identifying the time and date of insertion and the asset information identifying the sheet-accepting device 100. Controller 121 subsequently controls I/O device 119 to transmit this report to management system 200 or directly to an employee responsible for monitoring such concerns. In another example, controller still generates the above-described report and transmit such report to management system 200 an employee responsible for monitoring such concerns, but also performs the processes of S109 and S111, rather than rejecting sheet N in S113. The sheet-accepting process for sheet N terminates after S111 or S113 is completed.

Figure 8:
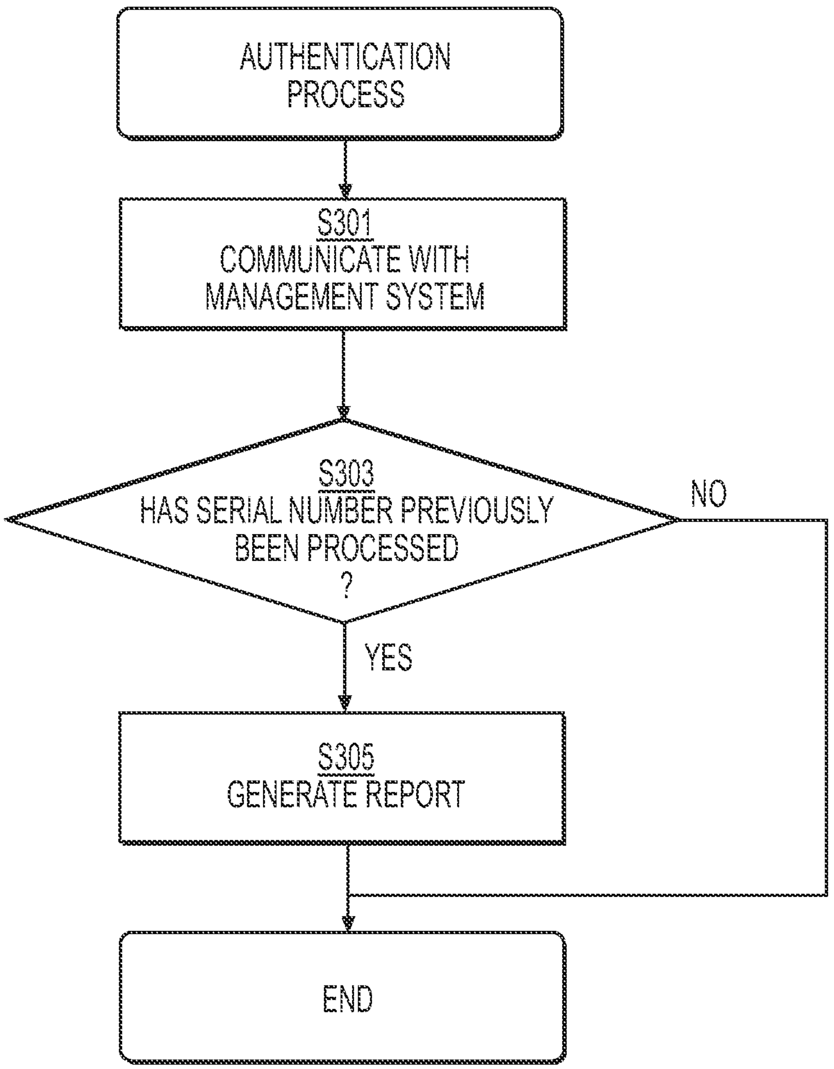
FIG. 8 is a flow chart showing an embodiment of an authentication process performed by the sheet-accepting device shown in FIG. 2.

FIG. 8 shows an exemplary authentication process performed by sheet-accepting device 100. Nevertheless, the authentication process of FIG. 8 similarly may be performed by one or more of sheet-processing device 400, receiving device 300, and management system 200. The authentication process is performed any time after information of sheet N is detected by a sensor mechanism, such as sensor mechanism 105 or sensor mechanism 405. In S301, controller 121 communicates with management system 200 to determine whether management system 200 has previously processed a sheet N within a predetermined period of time (e.g., 24 hours) having the same serial number as a sheet recently processed by sheet-accepting device 100. Specifically, controller 121 compares the serial number of a sheet N recently processed by sheet-accepting device 100 with a list of serial numbers of sheets N recently processed by devices managed by management system 200 within the predetermined period of time received from management system 200 to determine whether sheet N has previously been processed within the predetermined period of time.

When controller 121 determines that sheet N has previously been processed within the predetermined period of time (S303: YES), controller 121 generates a report indicating that a sheet, which was determined to be not authentic, was inserted in sheet-accepting device 100 and providing the information of sheet N detected by sensor mechanism 105, including date and time information identifying the time and date of insertion and the asset information identifying the sheet-accepting device 100. Controller 121 subsequently controls I/O device 119 to transmit this report to management system 200 or directly to an employee responsible for monitoring such concerns. Thereafter, the authentication process for sheet N ends. In other configurations, in which the authentication process is performed by sheet-accepting device 100, controller controls sheet-accepting device 100 to reject sheet N in a manner similar to S113 when controller 121 determines that sheet N has previously been processed within the predetermined period of time (S303: YES). When controller 121 determines that sheet N has not previously been processed within the predetermined period of time (S303: YES), the authentication process for sheet N ends.

In some configurations, controller 121 may not communicate with management system 200 to obtain the list of serial numbers of sheets N recently processed by devices managed by management system 200 within the predetermined period of time, but rather compares the serial number of a sheet N recently processed by sheet-accepting device 100 with a list of serial numbers of sheets N recently processed by sheet-accepting device 100 within the predetermined period of time that is stored locally at sheet-accepting device 100 by controller 121. In still other configurations, controller 121 communicates with an external database of counterfeits to obtain a list of counterfeit serial numbers and compares the serial number of a sheet N recently processed by sheet-accepting device 100 with the list of counterfeit serial numbers to determine whether sheet N is authentic. As noted above, each of controllers 121, 221, 321, 421 may perform the authentication process of FIG. 8.

Figure 9:
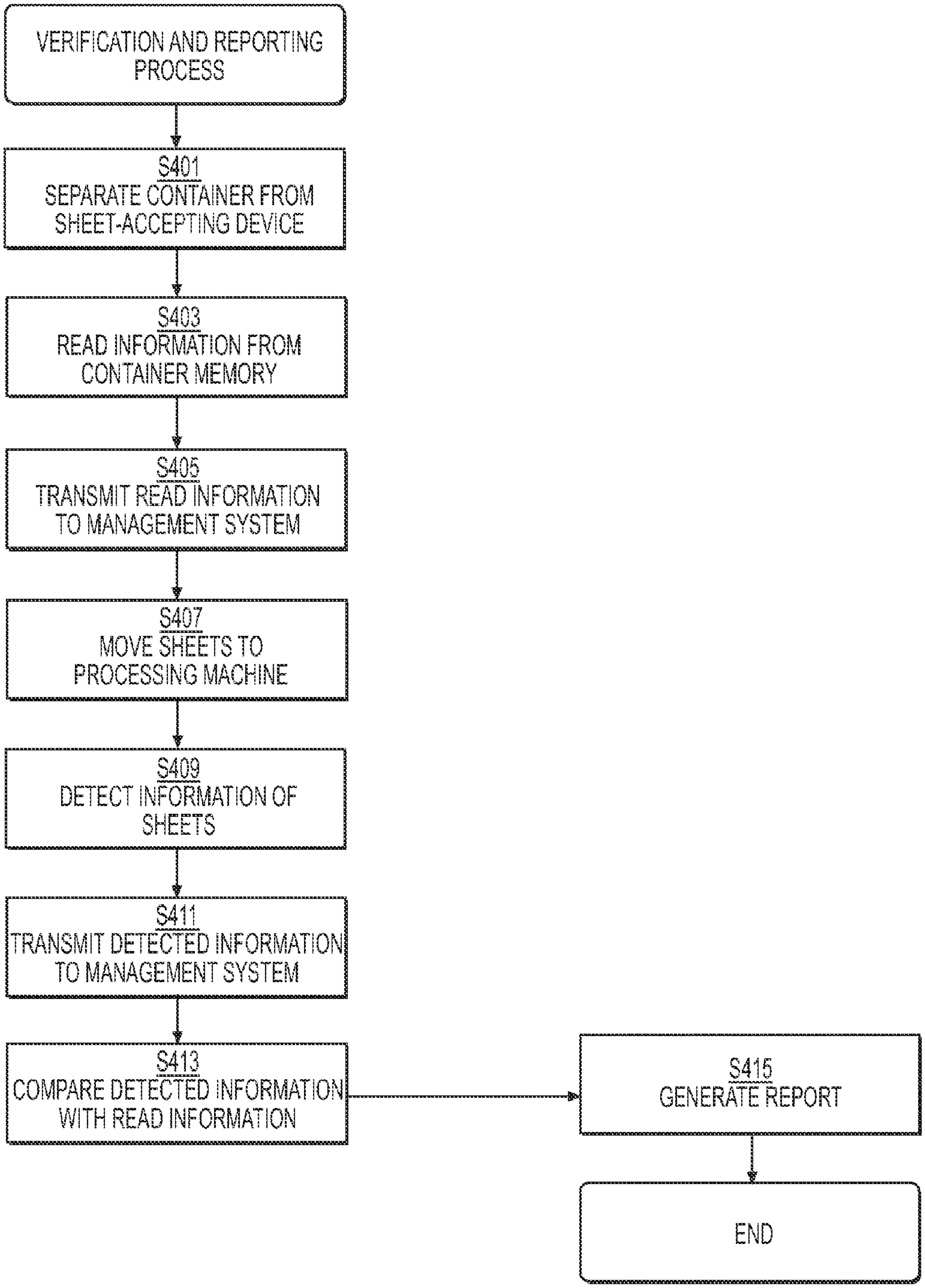
FIG. 9 is a flow chart showing an exemplary verification and reporting process performed in part by each of the receiving device, the sheet-processing device, and the management system shown in FIG. 4.

FIG. 9 shows an exemplary verification and reporting process performed in part by receiving device 300, sheet-processing device 400, and management system 200 in accordance with an embodiment of the present invention. In S401, an employee separates container 113 from sheet-accepting device 100 and transports container 113, including a plurality of sheets N disposed therein, to the count room. In other configurations, container 113 is separated from sheet-accepting device 100 and transported to the count room via an automated process. After being moved to the count room, container 113 is docked with receiving device 300. In S403, controller 321 controls RFID sensor 311 or another memory-reading device of receiving device 300 to read the asset information and the information of sheets N from RFID tag 115 or another memory coupled to container 113. In S405, controller 321 controls I/O device 319 to transmit the information read from RFID tag 115 or the other memory coupled to container 113 to management system 200 or to a middleware device for further processing, which ultimately transmits such information to management system 200. In some configurations, controller 321 controls I/O device 319 to transmit such information, or a portion thereof, to sheet-processing device 400.

In S407, an employee moves sheets N to sheet-processing device 400. S407 may be omitted if receiving device 300 and sheet-processing device 400 are integrated. Further, in some configurations, sheets N are moved from receiving device 300 to sheet-processing device via an automated process. In certain configurations, sheets N are separated from container 113 and moved to sheet-processing device 400, whereas, in other configurations, container 113, including sheets N disposed therein, is moved to sheet-processing device 400, and sheet-processing device 400 removes sheets N from container 113. Moreover, a plurality of sheets N from a plurality of different containers 113 previously coupled to different sheet-accepting devices 100 or other devices may be combined into a single stack for insertion into input mechanism 401 of sheet-processing device 400.

After sheets N are inserted into input mechanism 401, controller 421 controls one or more of input mechanism 401 and transport mechanism 403 to separate sheets N, such that transport mechanism 403 is able to transport each sheet N to sensor mechanism 405. In S409, controller 421 controls sensor mechanism 405 to detect information of each sheet N, including time and date of insertion information and count information, in a manner substantially similar to that performed by sensor mechanism 105 in S105. In S411, controller 421 controls I/O device 419 to transmit the information of each sheet N detected by sensor mechanism 405 to management system 200 or to a middleware device for further processing, which ultimately transmits such information to management system 200. In many configurations, however, because sheet-processing device 400 is often more robust than sheet-accepting device 100, sheet-processing device 400 obtains a greater quantity of information of each sheet N (e.g., more details of sheet N are detected) than sheet-accepting device 100.

S413 may be performed by one or more of sheet-processing device 400 and management system 200 in various configurations. Specifically, when receiving device 300 transmits the information read from RFID tag 115 or the other memory coupled to container 113 to sheet-processing device, sheet-processing device is able to perform S413. Management system 200 is able to perform S413 after receiving both the information read from RFID tag 115 or the other memory coupled to container 113 from receiving device 300 or the appropriate middleware device and the information of sheet N detected by sheet-processing device 400.

Figure 10:
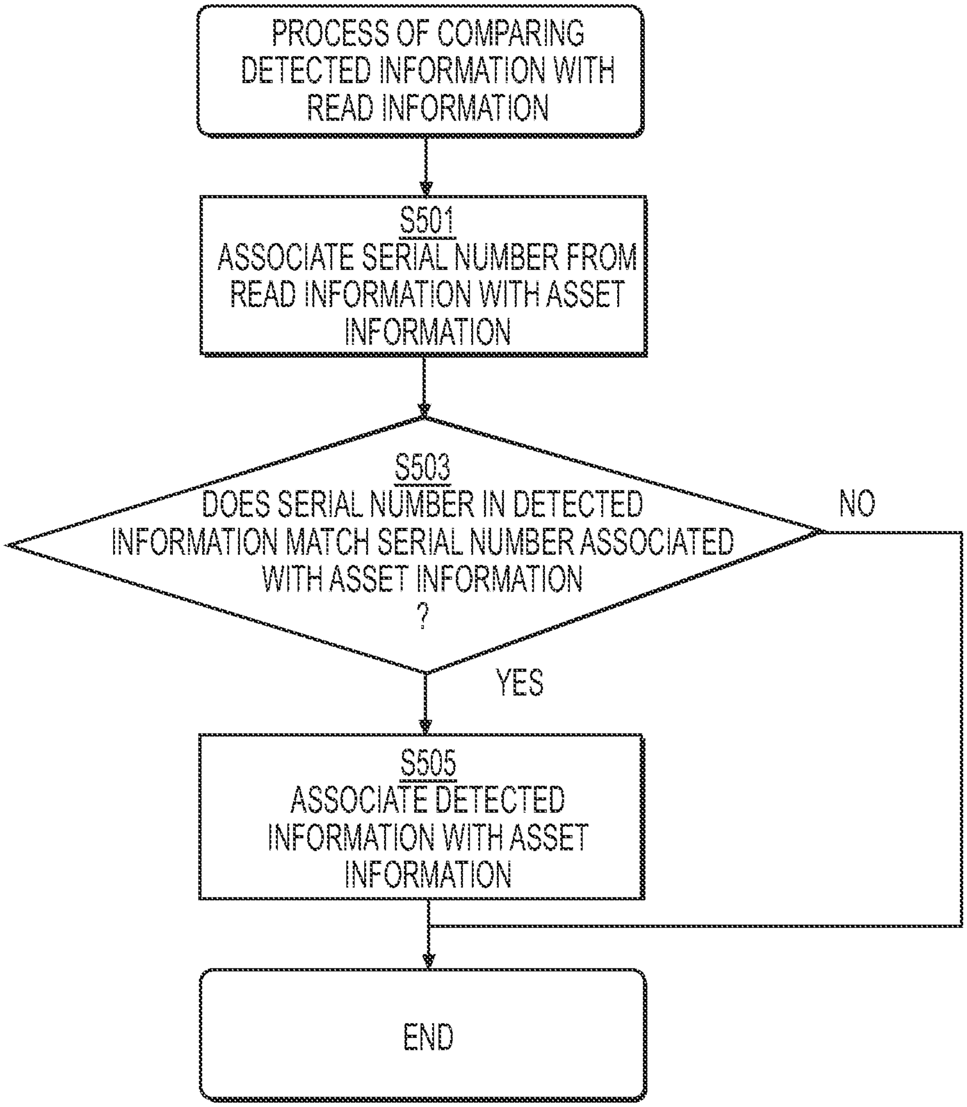
FIG. 10 is a flow chart showing an exemplary process of comparing obtained information with read information performed by the management system shown in FIG. 4.

In S413, for example, management system 200 compares the information read from RFID tag 115 or the other memory coupled to container 113 with the information of sheet N detected by sheet-processing device 400 to confirm the value of accepted sheets N and to associate the information of sheets N detected by sheet-processing device 400 with the sheet-accepting device 100 that originally accepted the sheet. FIG. 10 shows this exemplary process in more detail. In S501, management device 200 (e.g., controller 221) associates at least each serial number from the information read from RFID tag 115 (or other memory) coupled to container 113, which was previously transmitted to management system 200 by receiving device 300, with the asset information from the information read from the same RFID tag 115 (or the same other memory). In S503, for each sheet N processed by sheet-processing device 400, management system 200 searches the information read from RFID tags 115 (or the other memory) coupled to a plurality of containers 113 to determine whether a serial number that matches the serial number of sheet N detected by sheet-processing device 400 exists in the information read from RFID tags 115 (or the other memory) coupled to a plurality of containers 113. After management system 200 identifies a serial number from the information read by receiving device 300 that matches the serial number of sheet N detected by sheet-processing device 400 (S503: YES), management system 200 proceeds to S505 and associates the serial number of sheet N detected by sheet-processing device 400 and the other information of sheet N detected by sheet-processing device 400 with the asset information associated with the serial number from the information read by receiving device 300 that matches the serial number of sheet N detected by sheet-processing device 400. When management system 200 does not identify a serial number from the information read by receiving device 300 that matches the serial number of sheet N detected by sheet-processing device 400 (S503: NO), management system 200 notes that an error has occurred and does not associate the serial number with asset information. In certain configurations, management system 200 generates a report notifying firm (e.g., casino, bank, governmental, other entity) employees of this error. Accordingly, each sheet N processed by sheet-processing device 400 is associated with asset information identifying at least one of a particular sheet-accepting device 100 and a particular container 113, unless an error occurs during processing. Thus, the process of comparing detected information of a sheet N with read information may end after S505 or a negative determination in S503. Alternatively, rather than reporting being accomplished by management system 200, a middleware system, which is a software management package distinct from management system 200, can be programmed to generate error notification reports. For example, BPS Casino Connect is one example of a middleware system. Such a middleware system, for example, may include computer-readable instructions stored in a local or remote memory (e.g., a memory device or other non-transitory computer-readable medium) that may be executed by a processor, which is configured to implement the functions described by the computer-readable instructions. Further, the middleware system is configured to perform functions including, for example, retrieving information from one or more of sheet-accepting device 100, receiving device 300, and sheet-processing device 400; checking the validity of serial numbers and other features of sheets N based on retrieved information from sheet-accepting device 100, receiving device 300, and sheet-processing device 400 and, in some configurations, from external databases; and communicating with and providing information to management system 200, thereby linking the processes performed by one or more of sheet-accepting device 100, management system 200, receiving device 300, and sheet-processing device 400 from beginning to end.

In further configurations, management system 200 also compares the other read information (e.g., read by receiving device 300) of each sheet N with the other detected information (e.g., detected by sheet-processing device 400) of a sheet determined to have a matching serial number. In this manner, management system 200 is able to identify discrepancies (e.g., the information detected by sheet-accepting device 100 and read by receiving device 300 indicates the value of a sheet N with a particular serial number is $5.00, but the information detected by sheet-processing device 400 indicates that the value of a sheet N with the same serial number is $50.00) between the information of each sheet N detected by sheet-accepting device 100 and the information of the same sheet N detected by sheet-processing device 400. Accordingly, in such configurations, management system 200 notifies casino employees of such discrepancies including asset information and information about the time and date of insertion of the particular sheet N at issue, which assists management in identifying malfunctions in devices and resulting accounting errors. As noted above, S413 may be performed by sheet-processing device 400 in certain configurations. In such configurations, S413 notifies management system 200 of any errors.

Returning to FIG. 9, in S415, one or more of sheet-processing device 400 and management system 200 (or, alternatively or additionally, a middleware system) generates a report based on the information of each sheet N. Sheet-processing device 400 provides such reports to management system 200, and management system 200 provides such reports to casino employees. The reports include, for example, information identifying discrepancies between the information of sheets N detected by sheet-accepting devices 100 and sheet-processing devices 400, the total value of all sheets N inserted into a particular sheet-accepting device 100 and accepted, the total value of all sheets N disposed in a particular container 113, the value of each sheet N inserted into a particular sheet-accepting device 100 and accepted, the value of each sheet N disposed in a particular container 113, the value of each sheet N inserted into a particular sheet-accepting device 100 and rejected, or other detected information about sheets N described herein and relevant statistics thereof. In many configurations, the information provided in such reports corresponds to the information of sheets N detected by sheet-processing device 400 because sheet-processing device 400 is, in many configurations, a more advanced processing device than sheet-accepting device 100 and more accurately processes sheets N. In view of the above-described combinations of features, management system 200 is able to generate reports that associate the information detected by sheet-processing device 400 with particular sheet-accepting devices without using separator cards. After generating a report, the verification and reporting process ends.

Figure 11:
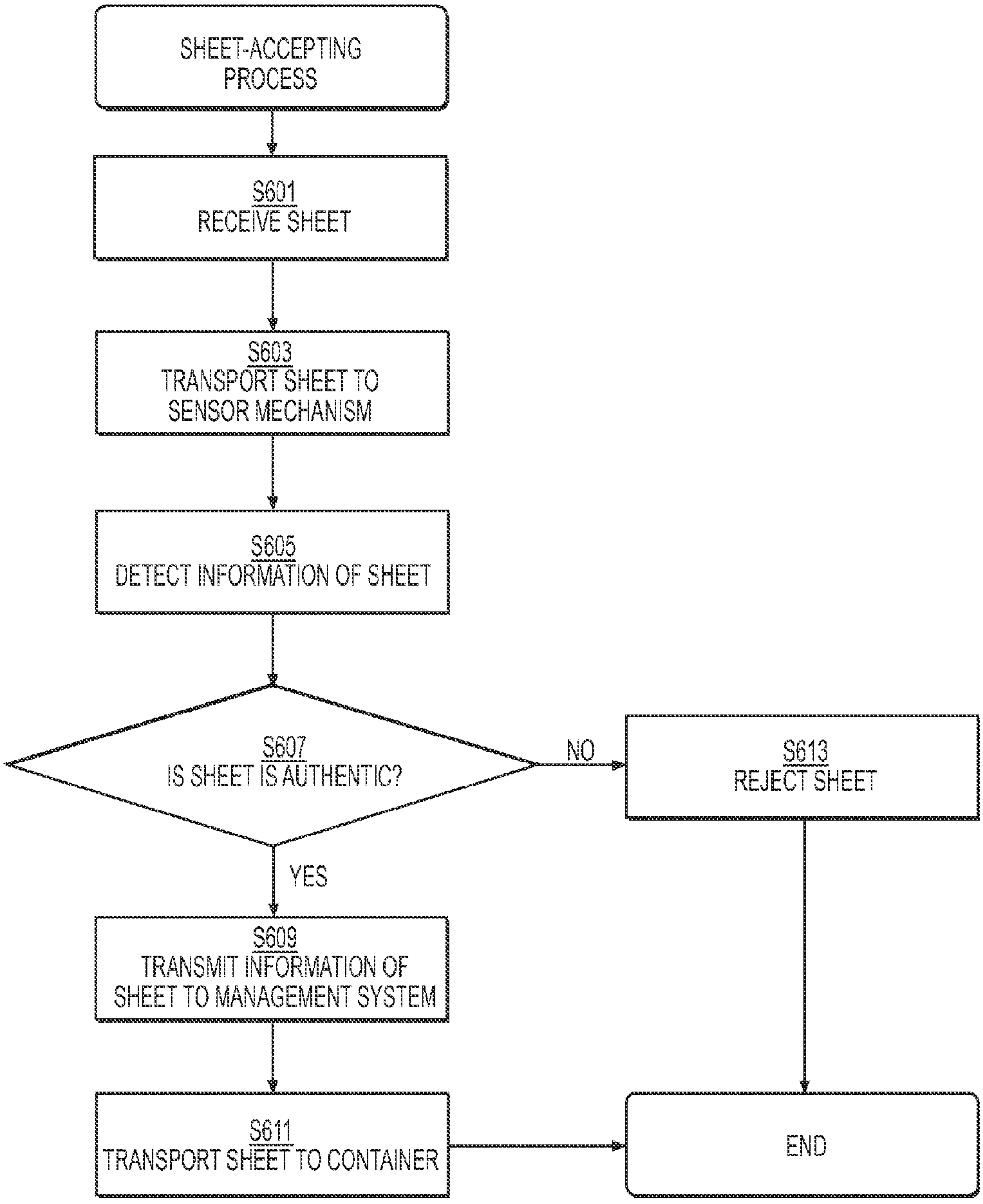
FIG. 11 is a flow chart showing an embodiment of another sheet-accepting process performed by the sheet-accepting device shown in FIG. 2.

FIG. 11 shows another exemplary sheet-accepting process performed by sheet-accepting device 100 in accordance with an embodiment of the invention. The sheet-accepting process shown in FIG. 11 is substantially similar to the sheet-accepting process shown in FIG. 6. Specifically, processes S601, S603, S605, S607, S611, and S613 are substantially similar to S101, S103, S105, S107, S111, and S113. Accordingly, further description thereof is omitted. In S609, controller 121 controls I/O device 119 to transmit the information of sheets N detected by sensor mechanism 105 to management system 200 or to a middleware device that ultimately reformats and retransmits such information to management system 200, rather than writing such information to a memory coupled to container 113. Accordingly, receiving device 300 may be omitted during later processing because management system 200 already has received the information of sheets N detected by sensor mechanism 105. In some configurations, sheet-accepting device 100 performs both S109 and S609 for redundancy purposes.

Figure 12:
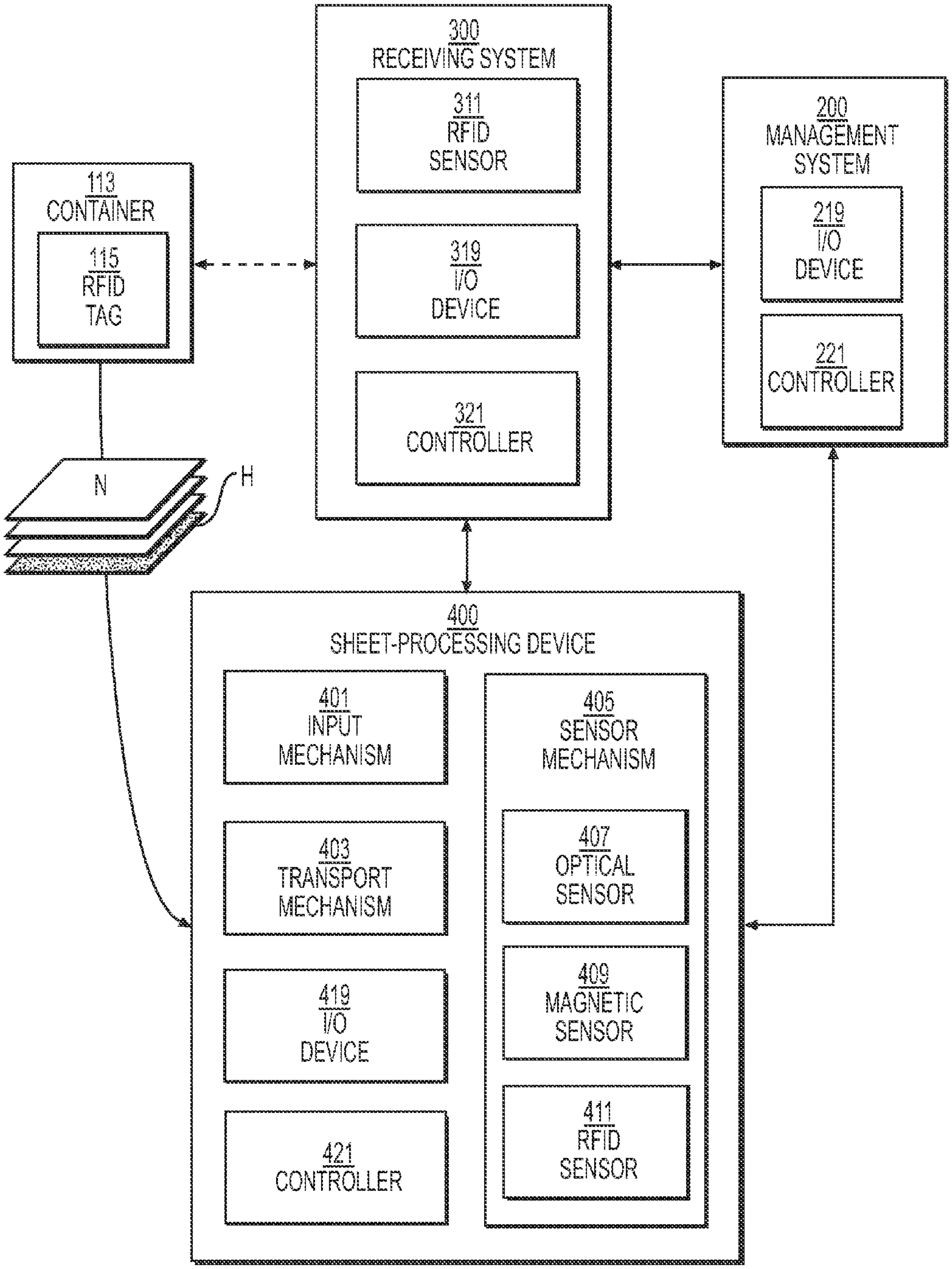
FIG. 12 is a schematic representation showing an embodiment of a system showing communications among the management system shown in FIG. 1, a receiving device, a sheet-processing device, and a container separated from the sheet-accepting device shown in FIG. 1 in which a separator card is utilized.

FIG. 12 is substantially similar to FIG. 4 and also shows an embodiment of a system including management system 200, a receiving device 300, a sheet-processing device 400, and container 113 separated from sheet-accepting device 100 and respective communications therebetween. Nevertheless, FIG. 12 shows that a separator card H is disposed with sheets N from container 113. Thus, in FIG. 12, this stack of sheets N and separator card H is inserted in input mechanism 401.

Figure 13A:
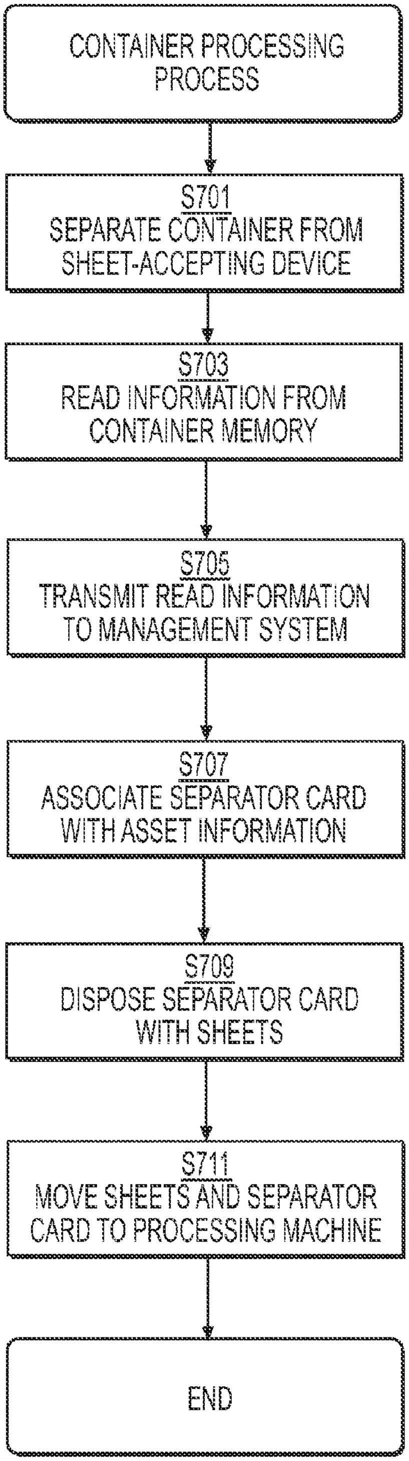
FIG. 13A is a flow chart showing an embodiment of a container processing process performed in part by the receiving device and the management system shown in FIG. 12.

FIG. 13A shows an embodiment of a container processing process performed in part by receiving device 300 and management system 200 in accordance with the system shown in FIG. 12. Processes S701, S703, and S705 are substantially similar to processes S401, S403, and S405. Accordingly, further description thereof is omitted. In S707, one of management system 200 and receiving device 300 associates a particular separator card H with the asset information stored in a particular RFID tag 115 (or other memory) coupled to a particular container 113. Thus, the particular header card H is associated with the at least one of the particular container 113 and the sheet-accepting device 100 to which the particular container was coupled. In S709, an employee or an automated system disposes the particular separator card H with sheets N from the particular container. If particular separator card H is a header card, particular separator card H is disposed under the plurality of sheets N, so that sheets N adjacent to particular separator card H are ultimately associated with particular separator card H. Similarly to S407, in S711, an employee or an automated system inserts sheets N and particular separator card H into input mechanism 401. In some configurations, sheets N and particular separator card H are separated from container 113 and then inserted into input mechanism 401. In other configurations, container 113, including sheets N and particular separator card H disposed therein, is inserted into input mechanism 401. Thereafter, the container processing process ends.

Figure 13B:
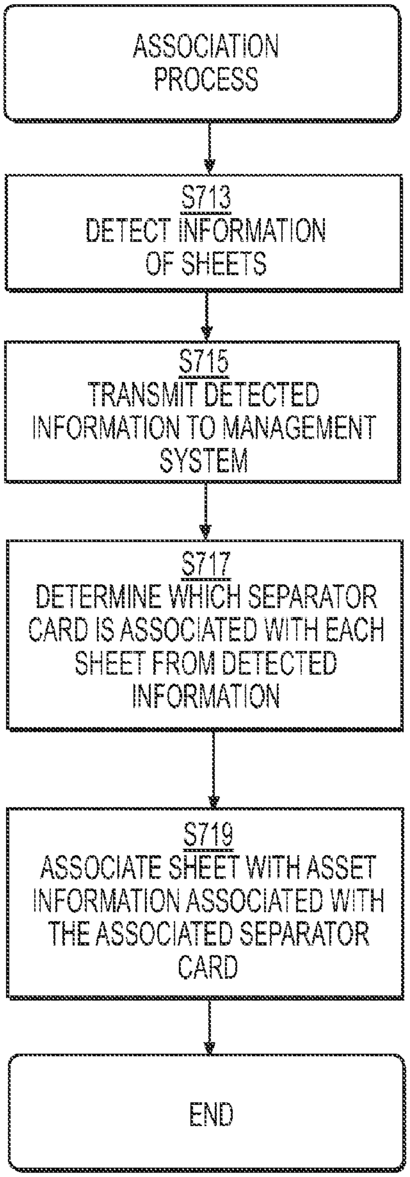
FIG. 13B is a flow chart showing an embodiment of an association process performed by the sheet-processing device and the management system shown in FIG. 12.

FIG. 13B shows an embodiment of an association process performed by sheet-processing device 400 and management system 200 in accordance with the system shown in FIG. 12. In S713, controller 421 controls sensor mechanism 405 to detect information of sheets N similarly to S409 and to identify positions of separator cards H disposed amongst sheets N in sheet-processing device 400. In S715, controller 421 controls I/O device 419 to transmit the detected information of sheets N and separator cards H, including the positions of separator cards H amongst sheets N, to management system 200. Otherwise, processes S713 and S715 are substantially similar to processes S409 and S411.

In S717, when separator cards H are used as header cards, for example, management system 200 (or a middleware system) associates sheets N detected after particular separator card H with particular separator card H until a new separator card H is detected, at which point management system 200 associates sheets N detected after new separator card H with new separator card H, and so on. In S719, management system 200 associates each sheet N associated with a particular separator card H with the asset information that is associated with the particular separator card H. Therafter, the association process ends. In some configurations, sheet-processing device 400, rather than management system 200, performs S717 and S719.

Accordingly, when management system 200 ultimately generates reports on accepted sheets N, management system 200 is able to generate information on a per-device basis by grouping the information of sheets associated with the same asset information, which associates the sheets with the same container 113 or the same sheet-accepting device 100. Further, it is possible to use a reusable separator card H because separator card H is associated with asset information in management system 200 prior to processing by sheet-processing device 400. For example, in particular configurations, the information of sheets N, including the serial numbers of each sheet N disposed in container 113, is linked to separator card H, which is different from known methods for processing currency, such as those described in U.S. Pat. No. 5,917,930 A, in which only aggregate and generalized information about a deposit is encoded on or linked with a separator card.

Figure 14:
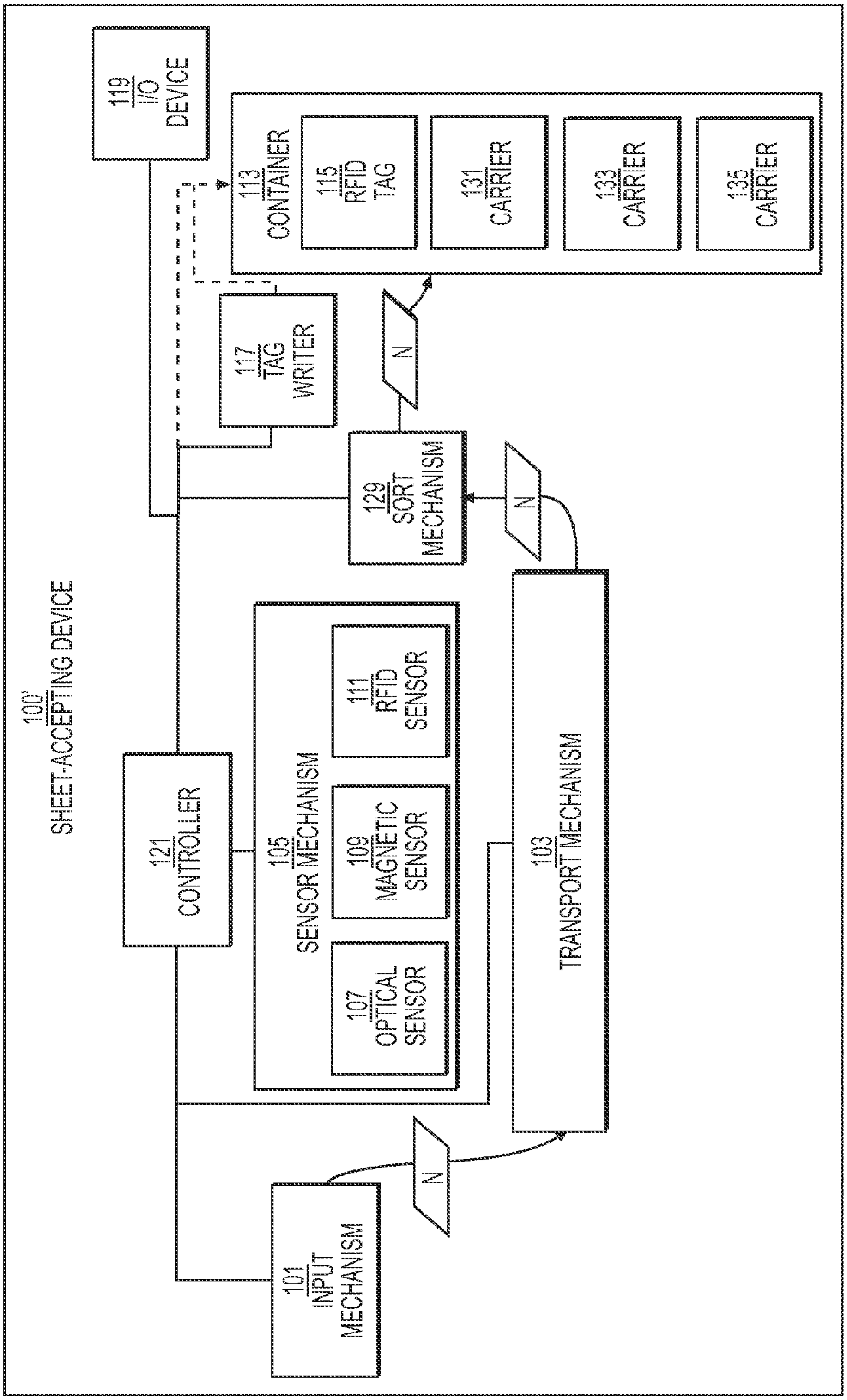
FIG. 14 is a schematic representation showing an embodiment of a modified version of the sheet-accepting device shown in FIG. 2.

FIG. 14 shows an embodiment of sheet-accepting device 100', which is a modified version of sheet-accepting device 100. Sheet-accepting device 100' is substantially similar to sheet-accepting device 100, except that sheet-accepting device 100' includes sort mechanism 129 and container 113', which is a modified version of container 113 that includes carriers 131, 133, 135 for separating different types of sheets N therein. Sort mechanism sorts different types of sheets N, such as, for example, currency notes, commercial tickets, and sheets determined as not authentic, into different carriers 131, 133, 135. By separating the different types of sheets N prior to processing in sheet-processing device 400, detecting errors may be reduced during detection by sensor mechanism 405. In particular configurations, for example, carriers 131, 133, 135 are individually secured and individually separable from one another, such that carriers 131, 133, 135 may be individually removed from container 113. In such configurations, each of carriers 131, 133, 135 may include its own RFID tag (or other memory) storing information similar to that stored by RFID tag 115. In other configurations, for example, two or more of carriers 131, 133, 135 are not individually secured and not individually separable.

Figure 15:
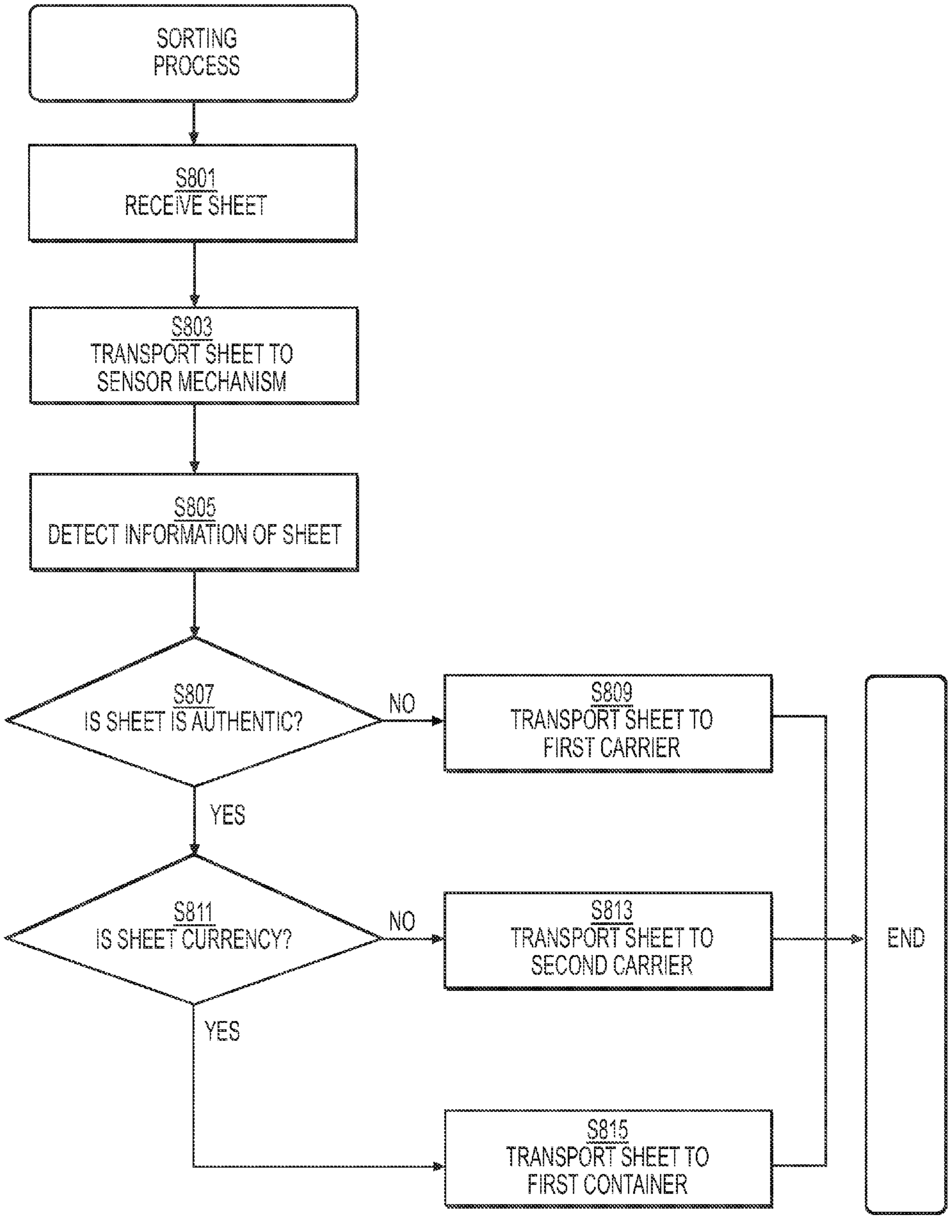
FIG. 15 is a flow chart showing an embodiment of a sorting process performed by the modified sheet-accepting device shown in FIG. 14.

FIG. 15 shows a sorting process performed by modified sheet-accepting device 100'. Processes S801, S803, S805, and S807 are substantially similar to S101, S103, S105, and S107. Accordingly, further description thereof is omitted. When controller 121 determines that a particular sheet N is not authentic (S807: NO), controller 121 proceeds to S809 and controls sorting mechanism 129 to dispose sheet N in carrier 131. When controller 121 determines that sheet N is authentic (S807: YES), controller 121 proceeds to S811 and determines whether sheet N is a currency note based on the information of sheet N detected by sensor mechanism 105. When controller 121 determines that sheet N is not currency (S811: NO), controller 121 proceeds to S813 and controls sorting mechanism 129 to dispose sheet N in carrier 133. When controller 121 determines that sheet N is currency (S811: YES), controller 121 proceeds to S815 and controls sorting mechanism 129 to dispose sheet N in carrier 135. Thereafter, the sorting process for sheet N ends. In other configurations, container 113' contains a different number of carriers, and controller 121 controls sorting mechanism 129 to sort based on other combinations of criteria (e.g., denomination, issuing entity, issue date, series).

The current invention is not limited to any particular field and may be used in a variety of fields, including but not limited to retail commerce and banking and casino environments. In each of these fields, a note collector, such as, for example, a retail merchant, a bank, or a casino, may use a currency counter or similar device to capture the serial numbers or other identifying information from the notes processed thereby. Accordingly, such capabilities now are described with respect to the following exemplary embodiments of the invention disclosed herein.

An originator of a deposit, such as a retail merchant, may utilize the following processes in accordance with the invention. When the retail merchant processes a deposit in a currency counter, the currency counter forwards the data obtained by the currency counter to a database, such as, for example, a database in the cloud. In addition to count data, the currency counter typically sends other data, such as name information (e.g., the name of the retail merchant), address information (e.g., the address of the retail merchant, the address where the note was collected), account number information (e.g., the retail merchant's deposit account number), and bank information for the deposit (e.g., the name of the bank where the deposit will be made). In many configurations, the currency counter obtains the serial number from each note and sends corresponding serial number data with the count data and the other data to the database.

Subsequently, for example, an armored carrier delivers the deposit to a deposit consolidator, such as the bank where the deposit will be made, a processing facility owned by the armored carrier, or another deposit consolidating facility where deposits from a plurality of depositors are consolidated. The deposit consolidator then utilizes a currency counter, which is configured to capture serial numbers of the notes in addition to gathering count data, to count and process the deposit. The deposit consolidator subsequently utilizes a management system to access the database storing the data obtained by the retail merchant's currency counter and to match the serial numbers obtained by the deposit consolidator with the serial numbers obtained by the retail merchant, such that the deposit consolidator is able to determine whether all notes processed by the retail merchant have been received by the deposit consolidator and whether any notes received by the deposit consolidator were not processed by the retail merchant. Accordingly, the management system is able to identify positive (e.g., notes identified by the currency processor but not correctly identified by the retail merchant) and negative (e.g., notes identified by the retail merchant but not correctly identified by the currency processor) distinctions between the notes processed by the retail merchant and the notes processed by the deposit consolidator and to report these distinctions to the retail merchant, the deposit consolidator, or another appropriate entity. Although the description above is provided in the context of a retail merchant, any originator of a deposit may utilize the processes and systems disclosed above.

In another exemplary configuration, the deposit consolidator can also implement the processes and systems disclosed herein to provide additional processing capability. For example, the deposit consolidator often receives deposits which have not already been captured and processed by the deposit originator in the manner disclosed above. In such situations, the deposit consolidator is able to use the currency counter to: count the notes, capture the serial numbers of the notes, and capture other data, such as name information (e.g., the name of the originator that made the deposit), address information (e.g., the address of the originator that made the deposit, the address where the note was collected), account number information (e.g., the originator's deposit account number), and deposit consolidator information for the deposit (e.g., the name of the deposit consolidator, such as the name of the bank where the deposit will be made). This information obtained by the currency counter can be stored in a database. The deposit consolidator subsequently forwards the deposit to a note sorter that sorts the notes. When the notes of the deposit comprise currency, the note sorter typically sorts the notes by denomination. In certain configurations, the note sorter sorts the notes by series in addition to or in the alternative to sorting by denomination. In other configurations, the note sorter sorts by serial number in addition to or in the alternative to sorting based on other characteristics. After sorting the notes, the deposit consolidator matches the serial numbers of the notes in the deposit, which were previously captured by the currency counter, with the sorted notes. In many configurations, the deposit consolidator uses a management system to perform this matching process. In other configurations, the matching process is performed by other means and the results of the matching process are entered into the management system. The management system identifies positive and negative distinctions between the notes processed by the currency counter and the sorted notes and reports these distinctions to responsible employees of the deposit consolidator or another appropriate entity.

In still another exemplary configuration, a system in a casino environment implements the processes and systems disclosed herein. In particular, casino table games, kiosks, and non-gaming devices serve as deposit originators in such systems. Many such table games have limited functionality and do not read serial number information from notes. In some configurations, however, casino table games may include a currency counter that is able to read serial numbers from notes, such as, for example, sheet accepting device 100. In such configurations, a process similar to that disclosed with respect to the deposit originators above can be used. For example, the currency counter obtains count data related to each note captured by the table game and placed into a canister, such as container 113. In addition to count data, the currency counter typically obtains other data, such as the serial number of each note, table information (e.g., identification information for the table game), time information (e.g., the time when the note was collected), and casino information (e.g., the name of the casino where the note was collected or where the notes will be processed). In some configurations, the currency counter stores the obtained information locally, such as on an RFID tag 115 disposed on container 113. In other configurations, the currency counter forwards the obtained data to a database, such as a database in the cloud or any other suitable database.

Subsequently, a plurality of processes similar to those shown in FIG. 9 are performed. Specifically, the canister storing the notes captured at a table game is detached from the table game and transported to a casino count room where the notes from a plurality of table games are consolidated. The casino then utilizes a currency counter, such as sheet-processing device 400, which is described below in more detail, to capture serial numbers of the notes from the table game in addition to counting and further processing such notes. When the table game currency counter has stored the obtained data locally, the casino utilizes a device, such as sensor mechanism 405 or receiving system 300, to access the obtained data (e.g., by reading RFID tag 115 attached to the canister) and transmits the obtained data to a casino management system, such as management system 200. When the table game currency counter has stored the obtained data in a remote database, for example, the casino management system accesses the database storing the data obtained by the table game's currency counter and matches the serial numbers obtained by the count room's currency counter with the serial numbers obtained by the table game's currency counter. By doing so, the casino management system is able to determine whether all notes processed by the table game have been received in the count room and whether any notes received in the count room were not processed by the table game. Accordingly, the casino management system is able to identify positive and negative distinctions between the notes processed by the table game and the notes processed in the count room and to report these distinctions to responsible employees of the casino or another appropriate entity.

In other configurations in which casino table games do not process notes or have limited functionality and do not identify serial numbers from the notes, a process similar to that disclosed with respect to the deposit consolidators above can be used. Notes collected by such table games are typically stored in removable canisters. On at least a daily basis, the canister storing the notes captured at a table game is transported to a casino count room where the notes from a plurality of table games are consolidated. The notes and other media, if present, are then removed from the canister and loaded into a currency counter. In the count room, the casino uses the currency counter to count the notes, capture the serial numbers of the notes, and capture other data, such as the serial number of each note, table information (e.g., identification information for the table game from which the note came), time information (e.g., the time when the note was collected or processed), and casino information (e.g., the name of the casino where the note was collected or where the notes will be processed) and stores the obtained information in a database. In many configurations, this process is performed individually for each canister, such that one canister is processed at a time. The currency counter performs the sorting function itself or forwards the notes associated with the table game to a note sorter that sorts the notes, an exemplary operation of which is described above. After sorting the notes, the casino matches the serial numbers of the notes associated with the table game, which were previously captured by the count room currency counter, with the sorted notes. In many configurations, the casino uses a casino management system to perform this matching process. In some configurations, the matching process is performed by other means and the results of the matching process are entered into the casino management system. The casino management system identifies positive and negative distinctions between the notes processed by the count room currency counter and the sorted notes and reports these distinctions to responsible employees of the casino or another appropriate entity.

Although the description above referred to casino table games, the table games described above can be replaced with kiosks and non-gaming devices and can be used in any commercial, governmental, or non-commercial environment, including environments other than casino environments.

Figure 16:
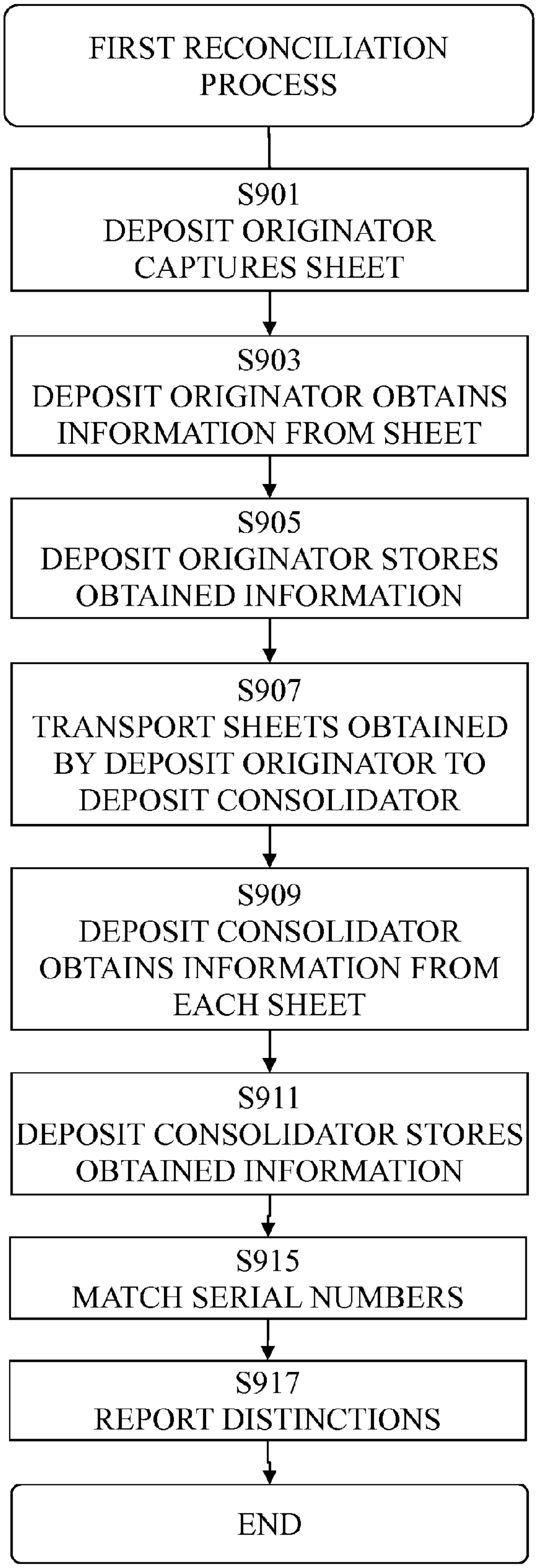
FIG. 16 is a flow chart showing a first reconciliation process for reconciling sheets captured and processed by a deposit originator with sheets processed by a deposit consolidator.
Figure 17:
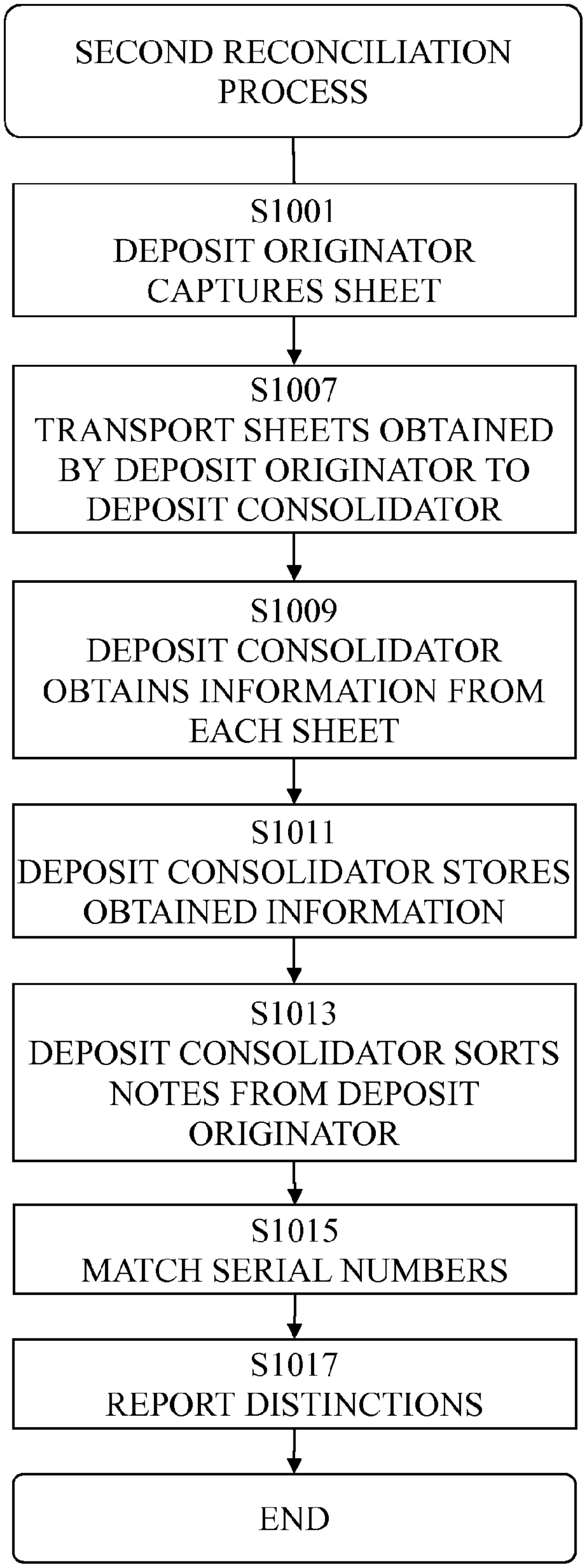
FIG. 17 is a flow chart showing a second reconciliation process for reconciling sheets processed by a deposit consolidator.

The note reconciliation processes disclosed above now are described with reference to FIGS. 16 and 17. FIG. 16 is a flow chart showing a first reconciliation process for reconciling sheets captured and processed by a deposit originator with sheets processed by a deposit consolidator. In other words, FIG. 16 corresponds to an exemplary system in which a deposit originator, such as a table game device, a kiosk, a slot machine, or a non-gaming device at a bank or a retail merchant, utilizes a currency counter, such as sheet accepting device 100, that is able to read serial numbers or other unique identifiers from sheets (e.g., notes, TITO tickets, vouchers). On the other hand, FIG. 17 is a flow chart showing a second reconciliation process for reconciling sheets processed by a deposit consolidator in a configuration in which a deposit originator utilizes a currency counter with limited functionality that does not read of reading serial numbers or other unique identifiers from sheets. In certain configurations, the processes shown in FIGS. 16 and 17 are implemented by one or more processors of one or more devices executing computer-readable instructions.

FIG. 16 shows a first reconciliation process for reconciling sheets captured and processed by a deposit originator with sheets processed by a deposit consolidator. The first reconciliation process is performed, for example, when a deposit originator utilizes a sheet processing device, such as sheet-accepting device 100, that is configured to obtain serial numbers or other unique identifiers from sheets. In S901, the deposit originator captures a sheet. This occurs, for example, when a dealer places the sheet into a sheet-accepting device, when a retail cashier's draw is loaded into a sheet-processing device at the end of a shift, or in many other situations. In some configurations, the sheet is disposed in a container, such as container 113, in a manner substantially similar to that of S111. In S903, the deposit originator obtains information from the sheet using the sheet-processing device. The sheet-processing device uses sensors, such as sensors 107, 109, 111, to determine information of the sheet, such as the sheet's value or denomination, series, serial number or other unique identifier, and physical attributes, and to count the sheet. S903 is substantially similar to the process of detecting information of the sheet shown in FIG. 7. In certain configurations, the obtained information includes other information, such as name information, address or location information, account number information, and bank or destination information for a deposit. In S905, the deposit originator stores the obtained information for later use. In some configurations, S905 is substantially similar to S109, in which the obtained information is written to a memory attached to the container in which the sheet is disposed, such as RFID tag 115. In other configurations, the obtained information is stored in a database, such as a database in the cloud or any other suitable database.

In S907, a deposit including a group of sheets captured by the deposit originator is transported from the deposit originator to a deposit consolidator, such as a bank, an armored carrier facility, or a casino count room, that consolidates deposits from a plurality of deposit originators. In some configurations, this process is substantially similar to S401, in which the deposit is transferred from the deposit originator to the deposit consolidator in the container. In S909, the deposit consolidator uses another sheet-processing device, such as sheet-processing device 400 to obtain information of each sheet in the deposit. The information of each sheet can include information similar to that obtained in S903. Such information typically includes at least a serial number or unique identifier of each sheet and the denomination or value of each sheet, as well as count information for the sheets in the deposit. In many configurations, S909 is substantially similar to S409. In S911, the deposit consolidator stores the obtained information from each sheet in the deposit. In many configurations, S911 is substantially similar to S411, whereby the deposit consolidator stores the obtained information by transmitting such information to a management system, such as management system 200. Alternatively, the deposit consolidator can store the obtained information in a local or remote database that the management system can later access.

In S915, the serial numbers obtained and stored by the deposit originator in S903 and S905, which correspond to sheets in the deposit, are compared with the serial numbers obtained and stored by the deposit consolidator in S909 and S911, which also correspond to sheets in the deposit, in order to confirm that the information from both sources matches. In many configurations, S915 is performed by the management system, whereby the management system utilizes processes similar to S403 and S405 to obtain the information stored in S905 when such information is stored on a memory attached to the container or accesses the appropriate database to obtain the information stored in S905 when such information is stored in a database. In S915, management system determines whether any serial numbers included in the obtained information from the deposit originator are missing from the obtained information from the deposit consolidator (e.g., a negative distinction) and whether any serial numbers included in the obtained information from the deposit consolidator are missing from the obtained information from the deposit originator (e.g., a positive distinction). Alternatively, the management system can utilize any unique identifier for a sheet in place of the serial number for matching in S915 if such unique identifier for the sheet is obtained in S903 and S909. In S917, the management system prepares a report identifying all positive and negative distinctions and provides the report to an appropriate entity, such as a responsible employee, a responsible authority, or another processing system, so that such distinctions can be appropriately reconciled. Thereafter, the first reconciliation process ends.

FIG. 17 shows a second reconciliation process for reconciling sheets processed by a deposit consolidator and received from a deposit originator that did not previously obtain serial numbers or other unique identifiers of the sheets. In S1001, which is substantially similar to S901, the deposit originator captures a sheet. In certain configurations, the deposit originator captures the sheet using a sheet-accepting device, such as a modified version of sheet-accepting device 100 that is not configured to determine serial numbers or unique identifiers of sheets. The sheet is disposed in a container, such as container 113, in a manner substantially similar to that of S111. In S1007, which is substantially similar to S907, a deposit including a group of sheets captured by the deposit originator is transported from the deposit originator to a deposit consolidator. In some configurations, this process is substantially similar to S401, in which the deposit is transferred from the deposit originator to the deposit consolidator in the container.

In S1009, which is substantially similar to S909, the deposit consolidator uses a sheet-processing device, such as sheet-processing device 400 to obtain information of each sheet in the deposit. The information of each sheet can include information similar to that obtained in S903 or S909. As noted above, such information typically includes at least a serial number or unique identifier of each sheet and the denomination or value of each sheet, as well as count information for the sheets in the deposit. In many configurations, S1009 is also substantially similar to S409. In S1011, which is substantially similar to S911, the deposit consolidator stores the obtained information from each sheet in the deposit. In many configurations, S1011 also is substantially similar to S411, whereby the deposit consolidator stores the obtained information by transmitting such information to a management system, such as management system 200. Alternatively, the deposit consolidator can store the obtained information in a local or remote database that the management system can later access.

In S1013, which is different from the processes of the first reconciliation process, the deposit consolidator sorts the sheets in the deposit. In some configurations, a modified version of sheet-processing device 400 includes a sheet sorting mechanism is used to perform the sorting of S103. In other configurations, an independent sheet sorting device is substantially similar to sheet-processing device 400 and includes many of the same components as sheet-processing device 400, such as a controller 421, a transport mechanism 403, and input mechanism 401, and a sensor mechanism 405. The sheets in the deposit can be sorted by one or more of denomination or value, serial number or other unique identifier, series, or by other obtained information.

In some configurations, the sorted sheets are processed again by the sheet-processing device, or another sheet-processing device, and information including the serial numbers or other unique identifiers of the sheets is obtained and stored in a manner similar to that of S1009 and S1011. In such configurations, this additional processing is part of S1015. In S1015, the serial numbers obtained and stored by the deposit consolidator in S1009 and S1011 are compared with the serial numbers obtained and stored by the deposit consolidator in the first part of S1015 in order to confirm that the information from the unsorted sheets matches the information from the sorted sheets. In many configurations, S1015 is performed by the management system. In S1015, management system determines whether any serial numbers included in the obtained information from the unsorted sheets are missing from the obtained information from the sorted sheets (e.g., a negative distinction) and whether any serial numbers included in the obtained information from the sorted sheets are missing from the obtained information from the unsorted sheets (e.g., a positive distinction). Alternatively, the management system can utilize any unique identifier for a sheet in place of the serial number for matching in S1015 if such unique identifier for the sheet is obtained in S1009. In S1017, the management system prepares a report identifying all positive and negative distinctions and provides the report to an appropriate entity, such as a responsible employee, a responsible authority, or another processing system, so that such distinctions can be appropriately reconciled. Thereafter, the second reconciliation process ends.

While the invention has been described in connection with various exemplary structures and illustrative embodiments, it will be understood by those skilled in the art that other variations and modifications of the structures, configurations, and embodiments described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A method for processing a plurality of sheets of sheet material, the method comprising:

receiving a sheet in a first sheet-processing device;

detecting, by a first sensor mechanism of the first sheet-processing device, first information of the sheet, the first information of the sheet including a first serial number of the sheet;

receiving each sheet of the plurality of sheets in a second sheet-processing device;

detecting, by a second sensor mechanism of the second sheet-processing device, second information of each sheet of the plurality of sheets, the second information of each sheet including a second serial number of such sheet;

determining whether the first serial number of the sheet matches the second serial number of any of the plurality of sheets; and generating a report in response to determining that the first serial number of the sheet does not match the second serial number of any of the plurality of sheets.

2. The method according to claim 1, wherein the report identifies the sheet having the first serial number that does not match the second serial number of any of the plurality of the sheets.

3. The method according to claim 1, further comprising:

receiving each sheet of an other plurality of sheets in the first sheet-processing device, the other plurality of sheets including the sheet;

determining whether the second serial number of each of the plurality of sheets matches the first serial number of any of the other plurality of sheets; and generating the report in response to determining that the second serial number of one or more sheets of the plurality of sheets does not match the first serial number of any of the other plurality of sheets.

4. The method according to claim 3, wherein the report identifies the sheet having the first serial number that does not match the second serial number of any of the plurality of the sheets when it is determined the first serial number of the sheet does not match the second serial number of any of the plurality of sheets, and wherein the report identifies the one or more sheets of the plurality of sheets have the second serial number that does not match the first serial number of any of the other plurality of sheets when it is determined that the second serial number of one or more sheets of the plurality of sheets does not match the first serial number of any of the other plurality of sheets.

5. The method according to claim 1, further comprising:

receiving each sheet of a deposit including the plurality of sheets in the first sheet-processing device;

detecting, by the first sensor mechanism of the first sheet-processing device, the first information of each sheet of the deposit, wherein the first information further includes a value of such sheet;

sorting the plurality of sheets into a particular order based on the value of each sheet of the deposit;

receiving each sheet of the plurality of sheets in the second sheet-processing device in the particular order;

determining whether the first serial number of each sheet of the deposit matches the second serial number of any of the plurality of the sheets; and generating the report in response to determining that the first serial number of one or more sheets of the deposit does not match the second serial number of any of the plurality of the sheets.

6. The method according to claim 5, wherein the report identifies each of the one or more sheets of the deposit having the first serial number that does not match the second serial number of any of the plurality of the sheets.

7. The method according to claim 5, wherein the first sheet-processing device and the second sheet-processing device are the same sheet-processing device.

8. A non-transitory, computer-readable medium storing computer-readable instructions therein, which, when executed by at least one processor, instructs the at least one processor to control processes for processing a plurality of sheets of sheet material, the processes comprising:

receiving a sheet in a first sheet-processing device;

detecting, by a first sensor mechanism of the first sheet-processing device, first information of the sheet, the first information of the sheet including a first serial number of the sheet;

receiving each sheet of the plurality of sheets in a second sheet-processing device;

detecting, by a second sensor mechanism of the second sheet-processing device, second information of each sheet of the plurality of sheets, the second information of each sheet including a second serial number of such sheet;

determining whether the first serial number of the sheet matches the second serial number of any of the plurality of sheets; and generating a report in response to determining that the first serial number of the sheet does not match the second serial number of any of the plurality of sheets.

9. The non-transitory, computer-readable medium according to claim 8, wherein the report identifies the sheet having the first serial number that does not match the second serial number of any of the plurality of the sheets.

10. The non-transitory, computer-readable medium according to claim 8, wherein the computer-readable instructions instruct the at least one processor to control processes further comprising:

receiving each sheet of an other plurality of sheets in the first sheet-processing device, the other plurality of sheets including the sheet;

determining whether the second serial number of each of the plurality of sheets matches the first serial number of any of the other plurality of sheets; and generating a report in response to determining that the second serial number of one or more sheets of the plurality of sheets does not match the first serial number of any of the other plurality of sheets.

11. The non-transitory, computer-readable medium according to claim 10, wherein the report identifies the sheet having the first serial number that does not match the second serial number of any of the plurality of the sheets when it is determined the first serial number of the sheet does not match the second serial number of any of the plurality of sheets, and wherein the report identifies the one or more sheets of the plurality of sheets have the second serial number that does not match the first serial number of any of the other plurality of sheets when it is determined that the second serial number of one or more sheets of the plurality of sheets does not match the first serial number of any of the other plurality of sheets.

12. The non-transitory, computer-readable medium according to claim 8, wherein the computer-readable instructions instruct the at least one processor to control processes further comprising:

receiving each sheet of a deposit including the plurality of sheets in the first sheet-processing device;

detecting, by the first sensor mechanism of the first sheet-processing device, the first information of each sheet of the deposit, wherein the first information further includes a value of such sheet;

sorting the plurality of sheets into a particular order based on the value of each sheet of the deposit;

receiving each sheet of the plurality of sheets in the second sheet-processing device in the particular order;

determining whether the first serial number of each sheet of the deposit matches the second serial number of any of the plurality of the sheets; and generating the report in response to determining that the first serial number of one or more sheets of the deposit does not match the second serial number of any of the plurality of the sheets.

13. The non-transitory, computer-readable medium according to claim 12, wherein the report identifies each of the one or more sheets of the deposit having the first serial number that does not match the second serial number of any of the plurality of the sheets.

14. The non-transitory, computer-readable medium according to claim 12, wherein the first sheet-processing device and the second sheet-processing device are the same sheet-processing device.

15. A system configured to process a plurality of sheets of sheet material, the system comprising:

a first sheet-processing device configured to receive a sheet, wherein the first sheet-processing device comprises:

a first sensor mechanism configured to detect first information of the sheet, the first information of the sheet including a first serial number of the sheet;

a second sheet-processing device configured to receive each sheet of the plurality of sheets, wherein the second sheet-processing device comprises:

a second sensor mechanism configured to detect second information of each sheet of the plurality of sheets, the second information of each sheet including a second serial number of such sheet; and a management system configured to:

determine whether the first serial number of the sheet matches the second serial number of any of the plurality of sheets, and generate a report in response to determining that the first serial number of the sheet does not match the second serial number of any of the plurality of sheets.

16. The system according to claim 15, wherein the report identifies the sheet having the first serial number that does not match the second serial number of any of the plurality of the sheets.

17. The system according to claim 15, wherein the first sheet-processing device is further configured to receive each sheet of an other plurality of sheets, the other plurality of sheets including the sheet, wherein the management system is further configured to determine whether the second serial number of each of the plurality of sheets matches the first serial number of any of the other plurality of sheets, and wherein the management system is further configured to generate the report in response to determining that the second serial number of one or more sheets of the plurality of sheets does not match the first serial number of any of the other plurality of sheets.

18. The system according to claim 17, wherein the report identifies the sheet having the first serial number that does not match the second serial number of any of the plurality of the sheets when the management system determines that the first serial number of the sheet does not match the second serial number of any of the plurality of sheets, and wherein the report identifies the one or more sheets of the plurality of sheets have the second serial number that does not match the first serial number of any of the other plurality of sheets when the management system determines that the second serial number of one or more sheets of the plurality of sheets does not match the first serial number of any of the other plurality of sheets.

19. The system according to claim 15, wherein the first sheet-processing device is further configured to receive each sheet of a deposit including the plurality of sheets, wherein the first sensor mechanism is further configured to detect the first information of each sheet of the deposit, wherein the first information further includes a value of such sheet, wherein the first sheet-processing device is further configured to sort the plurality of sheets into a particular order based on the value of each sheet of the deposit, wherein the second sheet-processing device is further configured to receive each sheet of the plurality of sheets in the particular order, wherein the management system is further configured to determine whether the first serial number of each sheet of the deposit matches the second serial number of any of the plurality of the sheets, and wherein the management system is further configured to generate the report in response to determining that the first serial number of one or more sheets of the deposit does not match the second serial number of any of the plurality of the sheets.

20. The system according to claim 19, wherein the first sheet processing device and the second sheet-processing device are the same sheet-processing device.

* * * * *